(12) United States Patent
Sawatari et al.

(10) Patent No.: US 6,632,932 B1
(45) Date of Patent: Oct. 14, 2003

(54) TRISAZO COMPOUND

(75) Inventors: Yoshihiro Sawatari, Hirakata (JP); Makiko Matsui, Hirakata (JP); Shuji Sugawara, Hirakata (JP)

(73) Assignee: Orient Chemical Industries, Ltd., Osaka (JP)

( * ) Notice: Subject to any disclaimer, the term of this patent is extended or adjusted under 35 U.S.C. 154(b) by 0 days.

(21) Appl. No.: 10/279,872

(22) Filed: Oct. 25, 2002

(30) Foreign Application Priority Data

Oct. 26, 2001 (JP) ........................................ 2001-328861

(51) Int. Cl.[7] ............................................... C09B 31/16
(52) U.S. Cl. ........................ 534/810; 534/728; 534/815
(58) Field of Search ................................ 534/810, 815, 534/728

(56) References Cited

U.S. PATENT DOCUMENTS 5,423,906 A * 6/1995 Gregory et al. ........... 106/31.48
5,437,716 A * 8/1995 Sano et al. ................ 106/31.52

FOREIGN PATENT DOCUMENTS

| EP | 0539178 | 4/1993 |
|----|---------|--------|
| EP | 0556741 | 8/1993 |
| EP | 0645435 | 3/1995 |

* cited by examiner

*Primary Examiner*—Fiona T. Powers
(74) *Attorney, Agent, or Firm*—Birch, Stewart, Kolasch & Birch, LLP

(57) ABSTRACT

The objective of the present invention is to provide a high-purity trisazo compound with excellent light resistance that is useful as a coloring matter for a black aqueous ink for ink jet recording and the like. Thus, the present invention provides a trisazo compound represented by the formula:

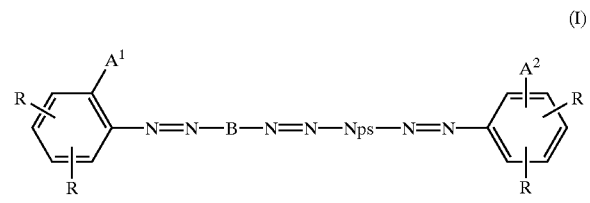

(I)

wherein $A^1$ is a group represented by the formula —COOM or —$SO_3M$, $A^2$ is a hydrogen atom or a group represented by the formula —COOM or —$SO_3M$, M is each independently a hydrogen atom, or onium, R is each independently a hydrogen atom, an alkyl group, an alkoxy group and the like, B is a residue of K acid, Nps is a residue of γ acid, J acid, or RR acid.

8 Claims, 17 Drawing Sheets

| PKNO | TIME | AREA | MK | IDNO | CONC | NAME |
|---|---|---|---|---|---|---|
| 1 | 9.752 | 58359 | V | | 2.0779 | |
| 2 | 10.435 | 34564 | SV | | 1.2307 | |
| 3 | 10.945 | 2704269 | T | | 96.2876 | |
| 4 | 11.977 | 5434 | V | | 0.1935 | |
| 5 | 23.933 | 5906 | | | 0.2103 | |
| | TOTAL | 2808532 | | | 100 | |

| PKNO | TIME | AREA | MK | IDNO | CONC | NAME |
|---|---|---|---|---|---|---|
| 1 | 8.347 | 7138 | V | | 0.3737 | |
| 2 | 9.435 | 25815 | SV | | 1.3513 | |
| 3 | 9.778 | 1864870 | | | 97.6214 | |
| 4 | 21.467 | 12486 | | | 0.6536 | |
| | TOTAL | 1910308 | | | 100 | |

| PKNO | TIME | AREA | MK | IDNO | CONC | NAME |
|---|---|---|---|---|---|---|
| 1 | 10.207 | 5378 | V | | 0.2243 | |
| 2 | 11.193 | 5257 | V | | 0.2193 | |
| 3 | 11.607 | 13768 | V | | 0.5744 | |
| 4 | 12.047 | 2310076 | SV | | 96.3713 | |
| 5 | 12.755 | 14923 | T | | 0.6225 | |
| 6 | 13.85 | 32645 | T | | 1.3619 | |
| 7 | 15.473 | 15012 | TV | | 0.6263 | |
| TOTAL | | 2397058 | | | 100 | |

| PKNO | TIME | AREA | MK | IDNO | CONC | NAME |
|---|---|---|---|---|---|---|
| 1 | 9.203 | 9544 | V | | 1.0628 | |
| 2 | 9.533 | 858444 | SV | | 95.594 | |
| 3 | 10.795 | 21956 | T | | 2.445 | |
| 4 | 21.617 | 8066 | | | 0.8982 | |
| | TOTAL | 898010 | | | 100 | |

| PKNO | TIME | AREA | MK | IDNO | CONC | NAME |
|---|---|---|---|---|---|---|
| 1 | 8.227 | 175028 | V | | 10.5415 | |
| 2 | 9.098 | 44749 | SV | | 2.6951 | |
| 3 | 9.488 | 1429985 | T | | 86.125 | |
| 4 | 10.598 | 10599 | | | 0.6383 | |
| | TOTAL | 1660360 | | | 100 | |

| PKNO | TIME | AREA | MK | IDNO | CONC | NAME |
|---|---|---|---|---|---|---|
| 1 | 9.913 | 10764 | V | | 0.5575 | |
| 2 | 10.14 | 5276 | V | | 0.2733 | |
| 3 | 11.393 | 26846 | V | | 1.3904 | |
| 4 | 11.87 | 23128 | V | | 1.1978 | |
| 5 | 12.532 | 8182 | V | | 0.4238 | |
| 6 | 13.652 | 20123 | V | | 1.0422 | |
| 7 | 14.052 | 22629 | V | | 1.172 | |
| 8 | 14.503 | 1793574 | SV | | 92.8935 | |
| 9 | 16.517 | 5445 | TV | | 0.282 | |
| 10 | 16.88 | 5283 | TV | | 0.2736 | |
| 11 | 17.387 | 9535 | TV | | 0.4938 | |
| TOTAL | | 1930785 | | | 100 | |

| PKNO | TIME | AREA | MK | IDNO | CONC | NAME |
|---|---|---|---|---|---|---|
| 1 | 9.498 | 172703 | V | | 11.3246 | |
| 2 | 11.19 | 57571 | SV | | 3.775 | |
| 3 | 11.753 | 1286600 | | | 84.3657 | |
| 4 | 14.065 | 8154 | T | | 0.5347 | |
| | TOTAL | 1525027 | | | 100 | |

| PKNO | TIME | AREA | MK | IDNO | CONC | NAME |
|---|---|---|---|---|---|---|
| 1 | 3.88 | 6074 | | | 0.9932 | |
| 2 | 9.302 | 83769 | V | | 1.2852 | |
| 3 | 9.625 | 31807 | V | | 0.488 | |
| 4 | 10.317 | 78334 | V | | 1.2018 | |
| 5 | 10.893 | 6153968 | V | | 94.4157 | |
| 6 | 11.527 | 110475 | V | | 1.6949 | |
| 7 | 12.68 | 8207 | V | | 0.1259 | |
| 8 | 13.48 | 18779 | V | | 0.2881 | |
| 9 | 14.182 | 18805 | | | 0.2885 | |
| 10 | 22.493 | 7730 | | | 0.1186 | |
| | TOTAL | 6517946 | | | 100 | |

TRISAZO COMPOUND

This nonprovisional application claims priority under 35 U.S.C. §119(a) on Patent Application No. 2001-328861 filed in Japan on Oct. 26, 2001, which is herein incorporated by reference.

BACKGROUND OF THE INVENTION

1. Field of the Invention

The present invention relates to a trisazo compound useful as a coloring matter for an aqueous ink for writing materials or for an aqueous ink for ink jet recording.

2. Description of the Related Art

In the field of ink jet printing, there is a constant demand for high-speed and highly accurate printing. The level of the demand are becoming higher and higher. For example, high fastness such as light resistance and water resistance of printed materials, long-term stability of ink performance, safety and high-quality printing on various types of paper typified by plane paper and the like have recently been required. While the qualities that printed materials are required are becoming higher, the conventional dyes used as coloring matters of inks are unsatisfactory in density of printed materials and fastness with respect to water resistance and light resistance thereof, and are poor in long-term stability of ink. Thus, the conventional dyes have been becoming very difficult to simultaneously satisfy the many required qualities.

Under these circumstances, there are many attempts to satisfy the demands for density, water resistance and light resistance of printed materials by using pigments as coloring matters of printing inks. However, pigments have still not reached the levels of the dyes in print qualities and have problems with respect to long-term stability with time as ink. Therefore, pigments have not satisfied the demands sufficiently.

Further, pigments result in high cost because they require highly developed manufacturing techniques for the improvement in their physical and chemical properties such as dispersibility, stability with time and print density; pigments have disadvantage for providing low-cost products. Therefore, in the field of ink for ink jet, there is a particularly strong demand for dyes excellent in fastness with respect to density, water resistance and light resistance of printed materials.

In Japanese Patent Laid-Open Publication No. 2000-309721, a dye shown below is proposed that yields a recorded image of high density and of high toughness when printing is conducted on plain paper and that provides an ink stable for a long term.

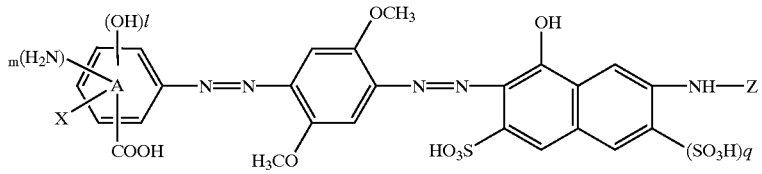

wherein X represents a carboxyl group, a sulfo group or a hydrogen atom, l and m each independently represent 0 or 1 and satisfy l+m=1, q represents 0 or 1, Z represents a hydrogen atom or a phenyl group that may be substituted with a carboxyl group or a sulfo group, provided that when q is 0, Z represents a phenyl group that may be substituted with a carboxyl group or a sulfo group.

The dyes disclosed in this publication show improvements in print density, light resistance and the like achieved by complicating functional groups of disazo dyes disclosed in Japanese Patent Laid-Open Publication No. H5(1993)-262998, etc. However, it is difficult for general synthetic methods by using γ acid (2-amino-8-naphthol-6-sulfonic acid) as a final coupling component to provide high purity.

The reason for this is that a derivative of γ acid intrinsically has a plurality of sites where the coupling reaction may take place (Chemistry of Synthetic Dyes, p. 154, published by Maki Shoten Co., Ltd.) and therefore, a single compound cannot be produced experimentally under alkaline condition through coupling with a diazonium salt made from a monoazo compound.

A dye generally contains a great large variety of impurities other than its main component and it is often difficult to analyze each of the impurity and to investigate its interaction with other components. However, as the amounts of the impurities increase, the probability that they interact mutually increases. The increase in the probability will appear as a degree of degradation, that is, as deterioration in storage stability or toughness such as light resistance when it is formulated into an ink.

There are few dyes that have a structure similar to that of the trisazo compound of the present invention. For example, the dyes having structure of H acid (1-amino-8-naphthol-3,6-disulfonic acid) are known widely. Examples of the known compounds include Naphthol Blue Black of the structure shown below.

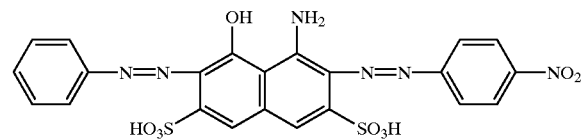

However, when an ink for ink jet recording is prepared by using only this disazo dye, optical density of the recorded image becomes insufficient, hue thereof also becomes unsatisfactory as a black ink, and its light resistance nor water resistance is not in the level for actual use. Further, the ink has a problem in dissolution stability of the dye.

In Japanese Patent Examined Publication No. S61(1986)-18590, a tetrakisazo dye of the structure shown below is used in a recording medium solution. However, it is, in general, difficult to obtain this kind of tetrakisazo dye as a high-purity product.

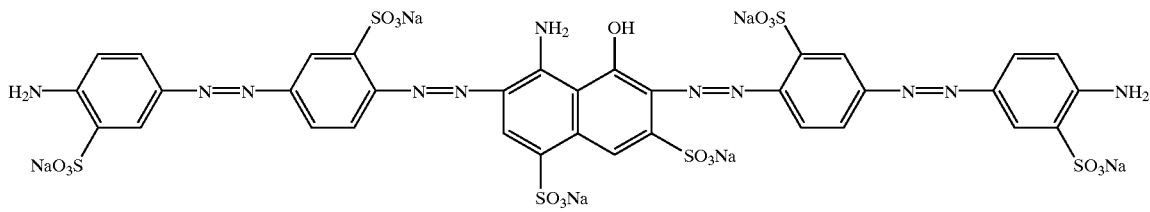

SUMMARY OF THE INVENTION

The objective of the present invention is to provide a high-purity trisazo compound with excellent light resistance that is useful as a coloring matter for a black aqueous ink for ink jet recording and the like.

Thus, the present invention provides a trisazo compound represented by the formula:

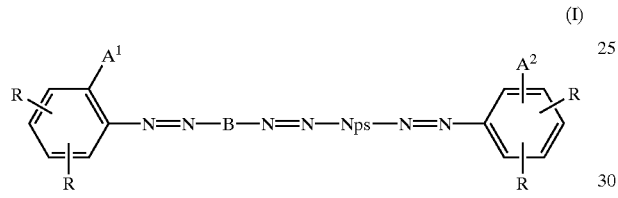

(I)

wherein $A^1$ is a group represented by the formula —COOM or —SO$_3$M wherein M is each independently a hydrogen atom, ammonium, alkali metal, hydroxyammonium, alkylammonium or alkanolammonium, $A^2$ is a hydrogen atom or a group represented by the formula —COOM or —SO$_3$M wherein M is the same as that described above, R is each independently a hydrogen atom, an alkyl group having from 1 to 6 carbon atoms, an alkoxy group having from 1 to 6 carbon atoms, a hydroxyl group, a sulfamoyl group, a carbamoyl group, a cyano group, an acetyl group, a sulfonic acid group, a carboxyl group or a halogen atom, B is a moiety represented by the formula:

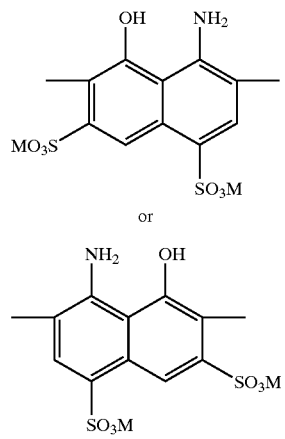

wherein, M is the same as that described above, Nps is a moiety represented by the formula:

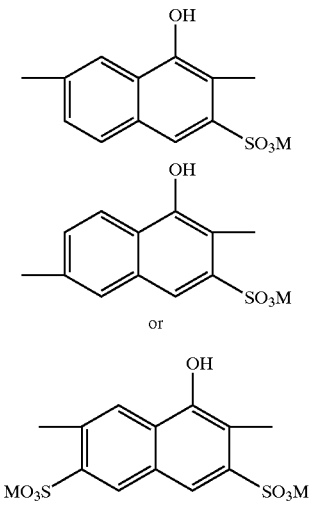

wherein M is the same as that described above; or the formula:

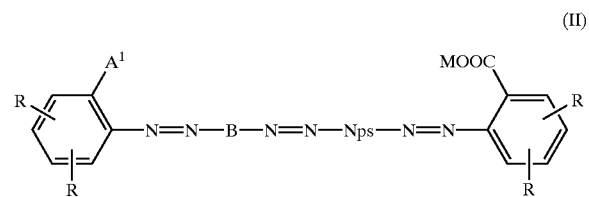

(II)

wherein M, $A^1$, R, B and Nps are the same as those described above.

Further, the present invention also provides a water-soluble dye containing the above-mentioned trisazo compound in an amount of not less than 85% by weight.

The water-soluble trisazo compound of the present invention has high purity. When the compound is used as a dye for an aqueous black ink for ink jet recording or the like, the ink has good dissolution stability and provides recorded images excellent in print density, light resistance and water resistance.

DETAILED DESCRIPTION OF THE INVENTION

Figure 1:
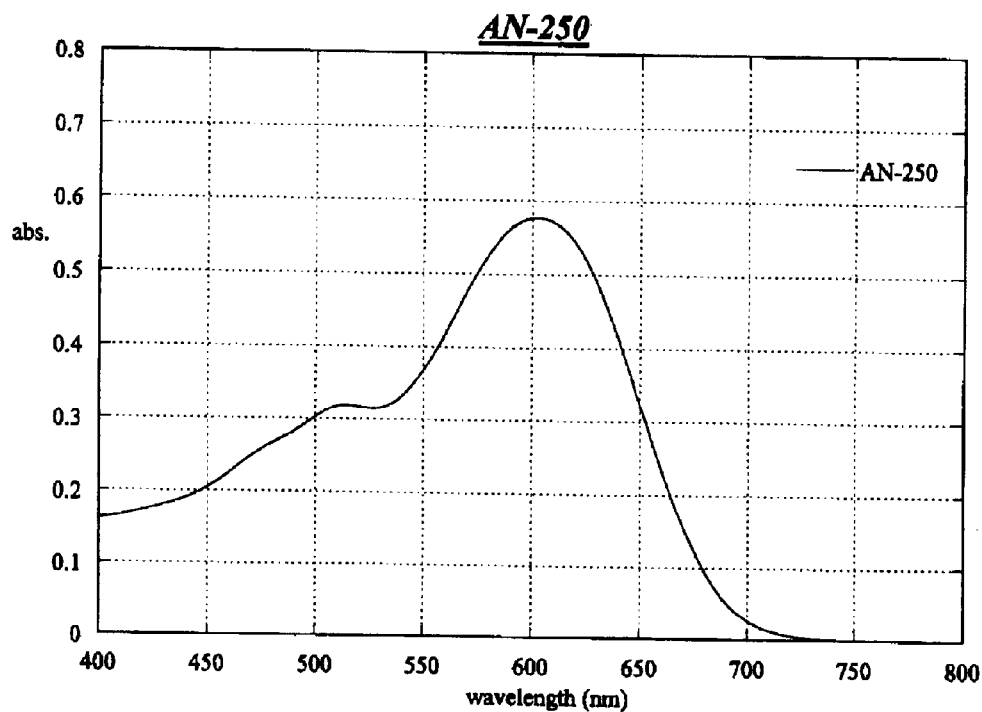
FIG. 1 shows a visible absorption spectrum of trisazo compound (1)

The trisazo compound (water-soluble dye) of the present invention can be produced via a diazotization-coupling process with reference to a well-known method, for example, a method described in Yutaka HOSODA, "New Dye Chemistry pp. 396 to 409", published by Gihodo Co., Ltd. on Dec. 21, 1973.

For instance, the trisazo compound of the present invention can be obtained by subjecting a diazo compound to the coupling reaction in the order, a, b and c as shown in the following formula:

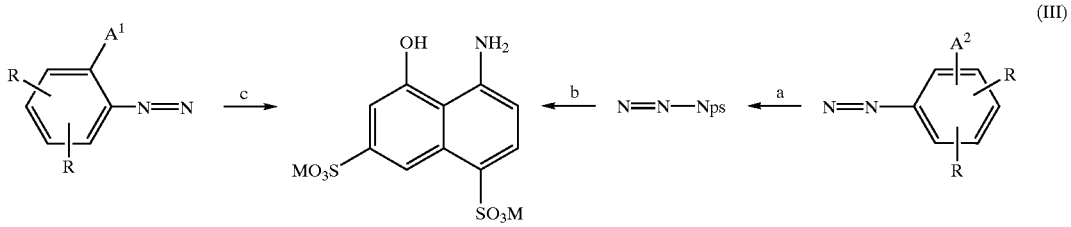

wherein M, $A^1$, $A^2$, R and Nps are the same as those described above. The synthesis procedure is described below.

In step a, an aniline derivative (1 mol) represented by formula:

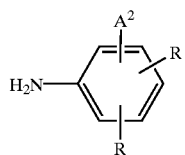

wherein $A^2$ and R are the same as those described above, is diazotized. Examples of the substituent R include a carboxyl group and an alkoxy group (for example, —$OCH_3$, and —$OC_2H_5$). Preferably $A^2$ is on ortho position with respect to an amino group. As the aniline derivatives, for example, compounds represented by the formulae:

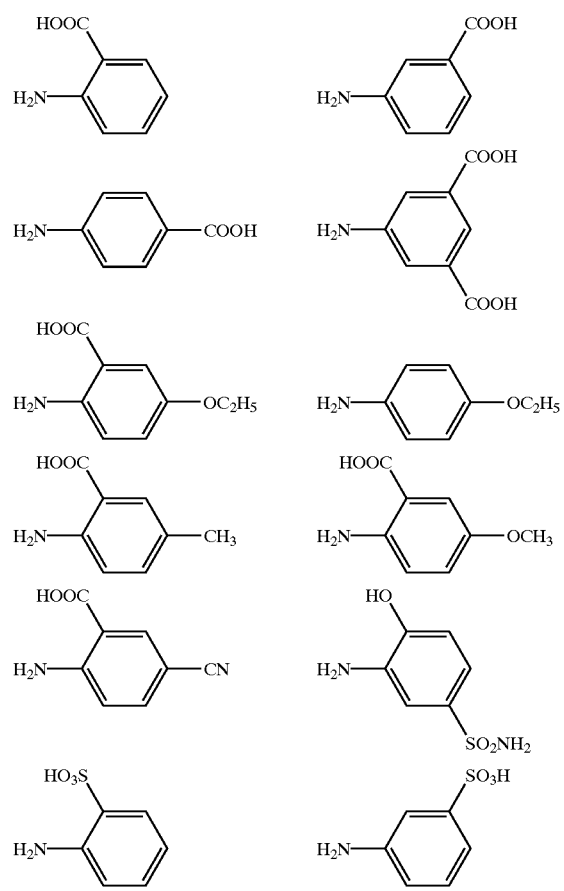

-continued

can be employed. Preferred aniline derivatives are anthranilic acid and phenetidine.

Next, the resulting diazotization product is subjected to alkaline coupling (pH=10.0 to 11.5) with a coupling component Nps—$NH_2$ (1 mol). Examples of Nps—$NH_2$ include γ acid represented by the formula:

J acid represented by the formula:

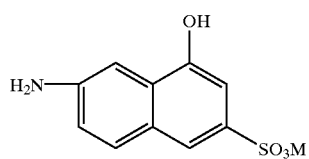

and RR acid represented by the formula:

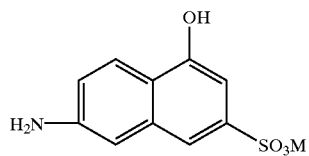

A preferred coupling component is γ acid. As a result, a monoazo intermediate shown below is obtained:

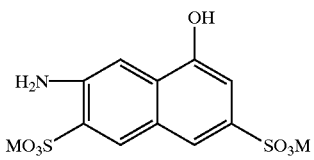

wherein $A^2$, R and Nps are the same as those described above.

In step b, the resulting monoazo intermediate (1 mol) is diazotized and then subjected to acidic coupling (pH not more than 4.0) with K acid (1 mol) represented by the formula:

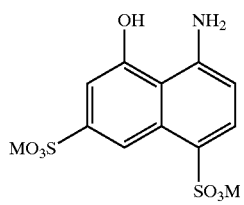

to obtain a disazo intermediate shown below:

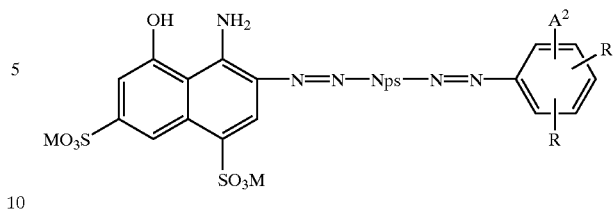

wherein M, $A^2$, R and Nps are the same as those described above.

In step c, an aniline derivative (1 mol) having a carboxyl group or a sulfonic acid group on its ortho position is diazotized. It is desirable that the carboxyl group is converted to an ester group (e.g., —$COOCH_3$) prior to the diazotization reaction. If the reaction is carried out in the state where a free carboxyl group remains, yield or purity of the compound may become poor. Examples of the aniline derivative include compounds represented by the formulae:

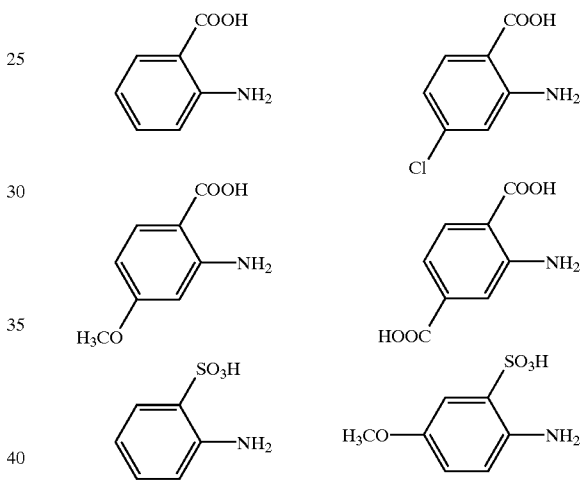

A preferred aniline derivative is anthranilic acid.

Subsequently, the resulting diazotization product is subjected to alkaline coupling (pH=9.5 to 11.5) with the above-mentioned disazo intermediate (1 mol) as a coupling component and, if an ester group is contained, the ester group is converted to a carboxyl group by hydrolysis, followed by desaltation and purification, to obtain the trisazo compound of the present invention represented by formula (III).

Otherwise, the trisazo compound of the present invention can be obtained by subjecting a diazo compound to the coupling reaction in the order; a, b and c as shown in the following formula:

(IV)

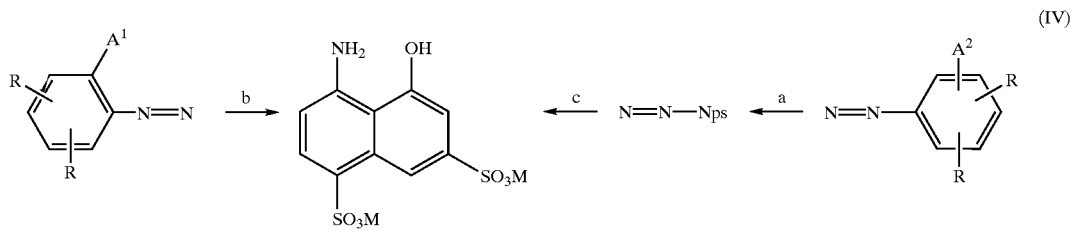

wherein $A^1$, $A^2$, R, Nps and M are the same as those described above. The compounds and conditions for the coupling reaction are the same as those described above in the synthesis procedure for the trisazo compound (III).

More specifically in this instance, the trisazo compound of the present invention represented by formula (IV) may be produced by the synthesis procedure which comprises the steps of:

a1) diazotizing an aniline derivative represented by the formula:

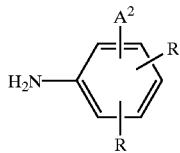

wherein, $A^2$ and R are the same as those described above;

a2) subjecting the resulted diazotization product to alkaline coupling with a coupling component selected from the group consisting of γ acid, J acid and RR acid to obtain a monoazo intermediate represented by the formula:

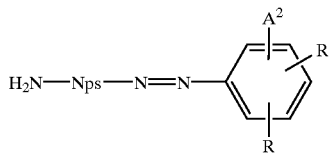

wherein $A^2$ and R are the same as those described above, and Nps is a residue of γ acid, J acid, or RR acid;

b1) diazotizing an aniline derivative having a carboxyl group or a sulfonic group on its ortho position represented by the formula:

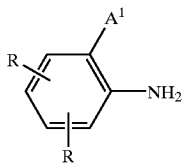

wherein $A^1$ and R are the same as those described above; and b2) subjecting the resulted diazotization product to acidic coupling with K acid to obtain a monoazo intermediate represented by the formula:

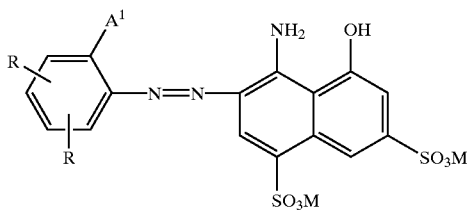

wherein $A^1$, R and M are the same as those described above;

c1) diazotizing the monoazo intermediate resulted in step a2); and c2) subjecting the resulted diazotization product to alkaline coupling with the monoazo intermediate resulted in step b2).

As described above, K acid is employed for a law material in synthesis of the trisazo compound of the present invention. By using K acid, structure specific to the trisazo compound of the present invention represented by the formula:

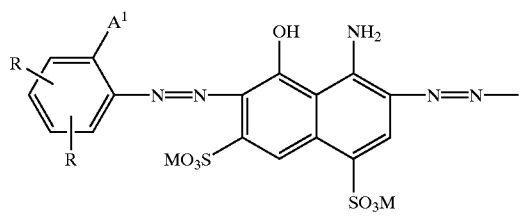

or

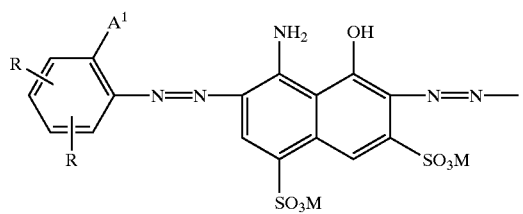

wherein M, $A^1$ and R are the same as those described above, is formed.

The trisazo compound (dye) of the present invention obtained in such manner is a high-purity product containing very small amount of impurities and has a purity determined by HPLC (high performance liquid chromatography) of preferably not less than about 85%, more preferably not less than 90%.

Preferred examples of the trisazo compound of the present invention are shown in the form of free acids as follows:

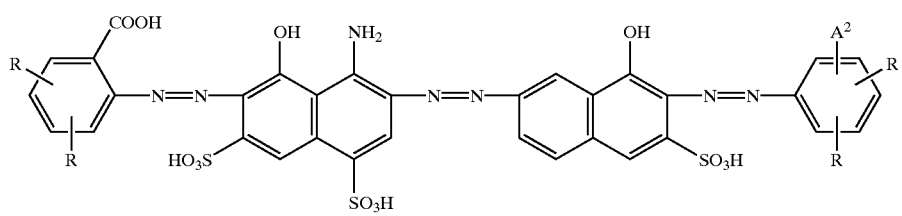

-continued

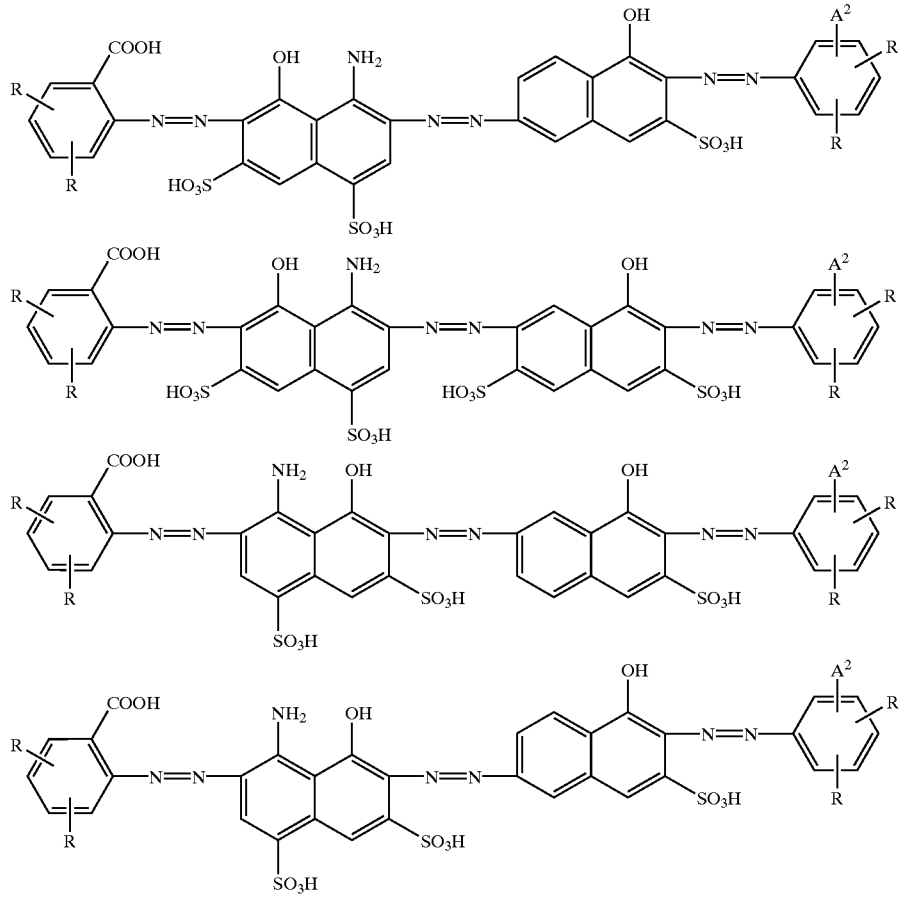

wherein $A^2$ is a hydrogen atom, a carboxyl group or a sulfonic group, R is each independently a hydrogen atom, an alkyl group having 1 to 6 carbon atoms, an alkoxy group having 1 to 6 carbon atoms, a hydroxyl group, a sulfamoyl group, a carbamoyl group, a cyano group, an acetyl group, a sulfonic group, a carboxyl group or a halogen atom.

Specific examples of the trisazo compound of the present invention in the form of free acid are shown below together with their maximum absorption wavelength ($\lambda_{max}$) However, this invention is not limited thereto.

TABLE 1

| Examples of trisazo compound | $\lambda_{max}$ (nm) |
|---|---|
| (1) AN-250 | 603.2 / 512.4 |
| (2) AN-251 | 608.0 |

TABLE 1-continued

| Examples of trisazo compound | λ_max (nm) |
|---|---|
| (3) AN-252 [structure] | 601.1 |
| (4) AN-253 [structure] | 605.2 |
| (5) AN-254 [structure] | 608.0 |
| (6) AN-255 [structure] | 614.2 / 507.8 |
| (7) AN-256 [structure] | 604.6 |

TABLE 2

| Examples of trisazo compound | λ_max (nm) |
|---|---|
| (8) AN-257 [structure] | 597.6 |

TABLE 2-continued

| Examples of trisazo compound | λ$_{max}$ (nm) |
|---|---|
| (9) AN-258 — structure | 608.4 |
| (10) AN-259 — structure | 604.2 |
| (11) AN-260 — structure | 597.6 |
| (12) — structure | 601.4 |
| (13) — structure | 596.2 |

TABLE 3

| Examples of trisazo compound | λ$_{max}$ (nM) |
|---|---|
| (14) AN-261 — structure | 624.4 |

TABLE 3-continued

| Examples of trisazo compound | λ_max (nM) |
|---|---|
| (15) [structure] | 626.0 |
| (16) [structure] | 621.2 |

The trisazo compound of the present invention exhibits high print density and high fastness (fastness with respect to light resistance, water resistance and stability) when it is used as a dye for an ink for ink jet recording. The cause of this has not been fully investigated, but it is probably because the compound has a structure with a combination of one aromatic ring having a carboxyl group or a sulfonic group on its ortho position with respect to a diazo bond and another aromatic ring derived from K acid. That is, the arrangement of the functional groups makes it difficult to form impurities during the coupling synthesis sequentially carried out and, as a result, oxide or the like that will deteriorate toughness is not formed, and the product becomes very high in purity.

In the present specification, although the specific examples of water-soluble groups (sulfonic groups and carboxyl groups) of trisazo compounds are expressed in the form of free acids, the compounds are dissolved in water in the form of salts together with alkali metals or amines. Examples of the alkali metals include Na, K and Li. Examples of the amines include ammonia; hydroxylamine; alkyl-substituted amines such as methylamine, dimethylamine, trimethylamine, ethylamine, diethylamine, triethylamine, propylamine, isopropylamine, dipropylamine, diisopropylamine, butylamine, isobutylamine, sec-butylamine, tert-butylamine, dibutylamine and allylamine; alkanolamines such as ethanolamine, diethanolamine, triethanolamine, propanolamine and diethylethanolamine; and their mixtures.

The following Examples further illustrates the present invention in detail but are not to be construed to limit the scope thereof.

EXAMPLE 1

Synthesis Example of Trisazo Compound (1) (AN-250)

Synthesis of monoazo intermediate: To 150 ml of water, 27.4 g (0.20 mol) of anthranilic acid was charged. This was dissolved by adding 20%-NaOH aqueous solution until the pH became 7.0. To the resulting solution, 42.2 g (0.22 mol) of a 36%-NaNO₃ aqueous solution was added and the temperature was lowered to 0° C. by adding ice. The pH was thereafter adjusted to 0.8 by adding 69.0 g (0.67 mol) of 35%-HCl aqueous solution. After stirring at 4° C. for 50 minutes, a diazo solution was obtained.

To 450 ml of water, on the other hand, 47.9 g (0.20 mol) of γ acid was charged. This was dissolved by adding 20%-NaOH aqueous solution until the pH became 7.0. The temperature of the solution was lowered to 0° C. in a cooling bath. A coupling reaction was carried out by gradually adding the diazo solution prepared previously to the cooled solution. During the reaction, the pH of the reaction solution was regulated between 10.0 and 11.5 by adding 20%-NaOH aqueous solution and, at the same time, the reaction temperature was held so as not to exceed 7° C. After stirring the reaction solution at 6° C. overnight, the pH of the solution was adjusted to 3.3 by dropping 35%-HCl aqueous solution. The precipitate was collected by filtration to obtain the monoazo intermediate shown below (purity: 95.2% determined by HPLC).

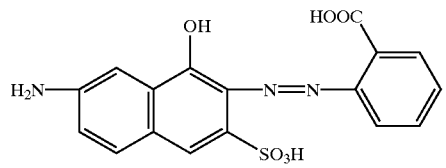

Synthesis of disazo intermediate: To 1000 ml of water, a press cake of the monoazo intermediate (about 0.2 mol) was charged. This was dissolved by adding 20%-NaOH aqueous solution until the pH became 6.1. To the resulting solution, 42.2 g (0.22 mol) of 36%-NaOH aqueous solution was added and it was cooled to 15° C. The pH was thereafter adjusted to 0.8 by adding 102.4 g (1.0 mol) of 35%-HCl aqueous solution. After stirring at 23° C. for 70 minutes, a diazo solution was obtained.

To 600 ml of water, on the other hand, 68.3 g (0.20 mol) of K acid was charged. This was dissolved by adding sodium carbonate. A coupling reaction was carried out under acidic condition by dropping the diazo solution prepared previously to the solution. During the reaction, the reaction temperature was regulated so as not to exceed 6° C. After the addition of the diazo solution, stirring was continued for 1 hour and then additional stirring was carried out overnight while adjusting the pH to not more than 4.0 by dropping 10%-Na$_2$CO$_3$ aqueous solution. The precipitate was collected by filtration to obtain a disazo intermediate shown below (purity: 80.3% determined by HPLC).

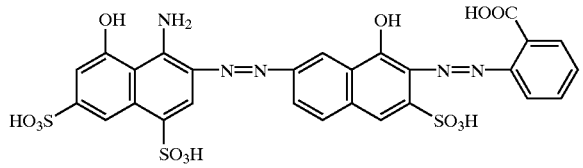

Synthesis of trisazo compound: To 150 ml of water, 28.7 g (0.19 mol) of methyl anthranilate was added and then 150 g of ice was charged. Thereafter, 51.4 g (0.50 mol) of 35%-HCl aqueous solution was added. After cooling this mixture to 0° C. or lower, 40.3 g (0.21 mol) of 36%-NaNO$_3$ aqueous solution was added and it was stirred at 3° C. for 50 minutes to obtain a diazo solution.

Separately, a press cake of the disazo intermediate (about 0.19 mol) was charged to 1700 ml of water this was dissolved by adding 20%-NaOH aqueous solution until the pH became 11.0. The temperature was lowered to −1° C. in a cooling bath. To the mixture, the diazo solution prepared previously was added gradually to carry out coupling. During this operation, the reaction condition was adjusted so that the pH of the reaction solution became from 8.0 to 11.0 by adding 20%-NaOH aqueous solution and the reaction temperature was held so as not to exceed 7° C. After stirring the reaction solution at 6° C. overnight, 680 g of table salt was added thereto and was stirred for a short period of time. A precipitate was collected by filtration.

The press cake obtained was charged to 1500 ml of water and the pH was adjusted to 12.5 or higher by adding 20%-NaOH aqueous solution and the mixture was stirred at 60° C. for 80 minutes. When the mixture was cooled to 40° C., a precipitate was collected by filtration. The press cake obtained was dissolved again in a proper amount of water. The solution was desalted with a reverse osmosis membrane (NTR-7430 manufactured by Nippon Denko Co., Ltd.) and then the dye desalted solution was dried by freeze drying to obtain objective trisazo compound (1), AN-250 (purity: 96.3% determined by HPLC, $\lambda_{max}$: 603.2 nm (in water)).

TABLE 4

Figure 8:
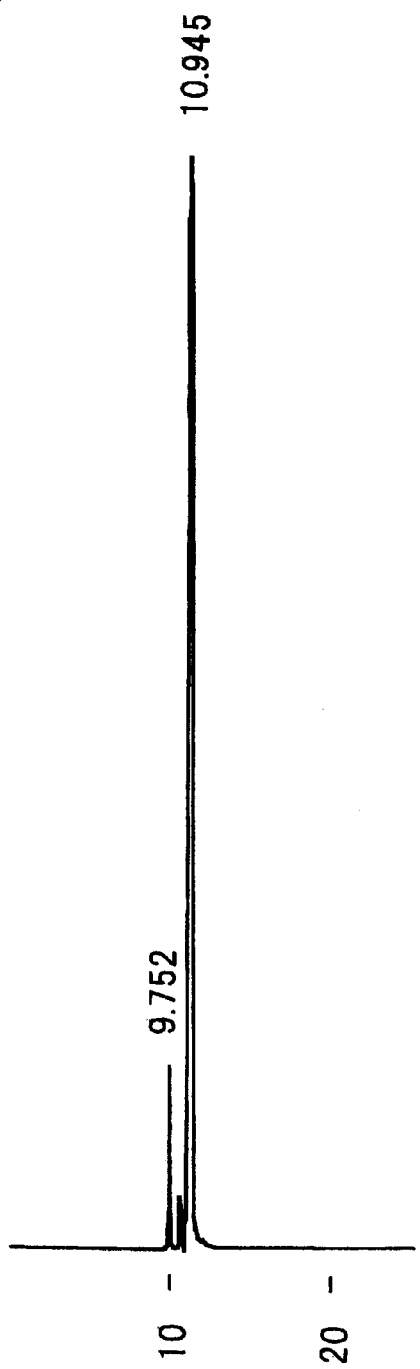
FIG. 8 shows an HPLC chart of trisazo compound (1)
Figure 15:
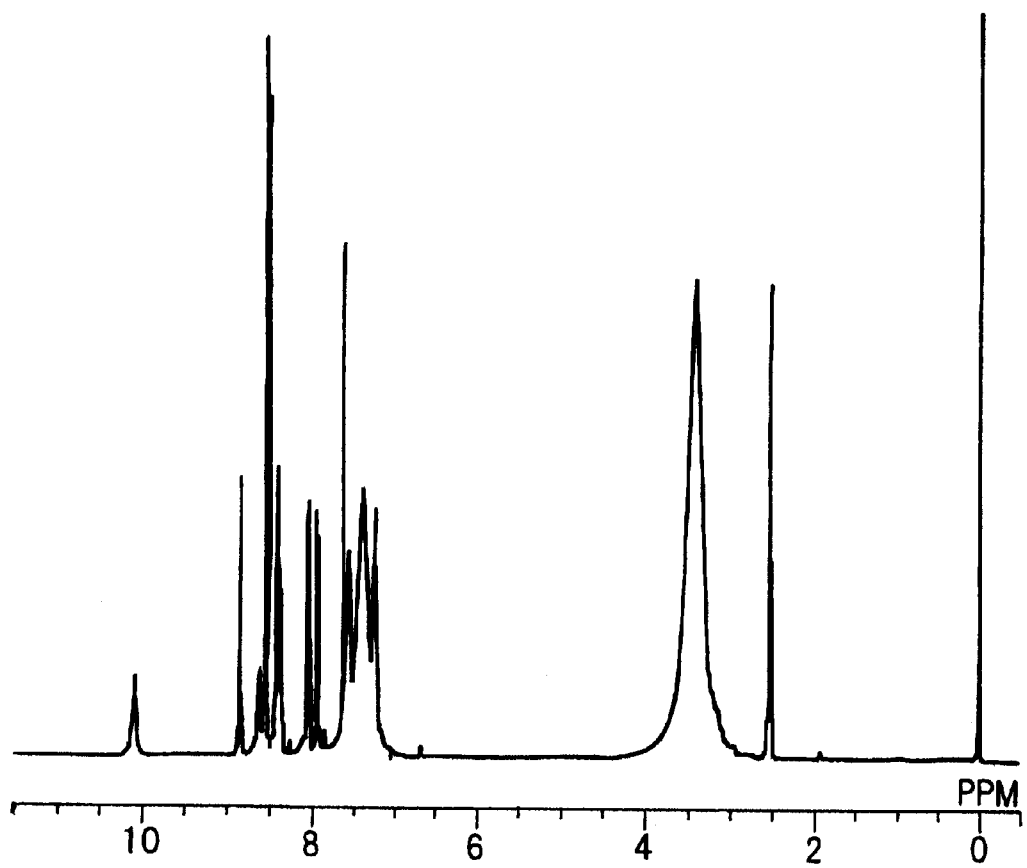
FIG. 15 shows an NMR spectrum of trisazo compound (1)
Figure 15:
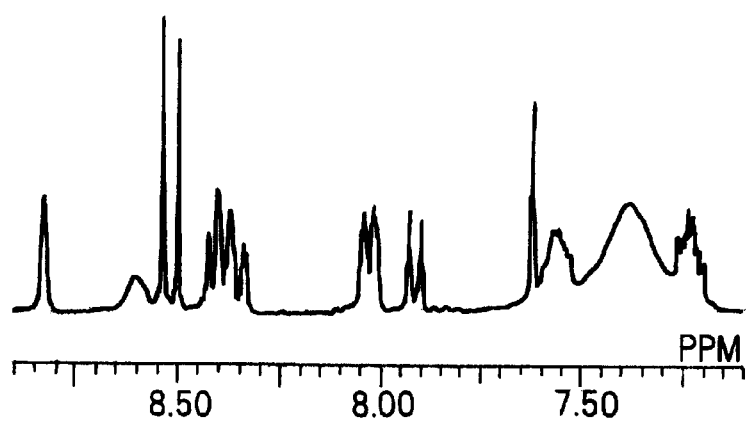

| Analysis data | |
| --- | --- |
| Visible absorption spectrum | FIG. 1 |
| HPLC (High-Performance Liquid Chromatography) | FIG. 8 |
| NMR spectrum | FIG. 15 |

Evaluation of Light Resistance
Preparation of Samples for Test:

TABLE 5

| Trisazo compound (dye) of the present invention | 6.0% by weight |
| --- | --- |
| Glycerin | 10% by weight |

TABLE 5-continued

| Diethyleneglycol monobutyl ether | 10% by weight |
| --- | --- |
| Water | The remainder |

An ink, the pH of which was adjusted between 9.0 and 9.5 with ammonia, prepared using the composition shown above was set into an ink jet printer (EM-900C manufactured by Seiko Epson Corp.). A piece of paper specially designed for ink jet (PM Photo Paper (Model: KA420PSK) manufactured by Seiko Epson Corp.) was printed with the ink, and it was used as a sample to be tested.

Light irradiation: The sample to be tested was set to a holder. Light irradiation with a xenon fade meter was carried out under the following condition:

TABLE 6

| Instrument used | ATLAS Ci4000 Xenon Weather-Ometer |
| --- | --- |
| Light source filter | Borosilicate/Soda lime |
| Intensity of irradiation | 36 W/m$^2$ (300 to 400 nm) |
| Chamber temperature (Temperature in chamber) | 24° C. |
| Chamber humidity | 55% |

Method for evaluation: The sample is taken out after each irradiation of an energy of 3000 kJ/m$^2$, and a part with an optical density (OD value) of about 1.0 is measured with a Macbeth density meter. The total amount of light irradiated at the time when the OD value has become 70% the original value is calculated.

Criterion for evaluation: The amount of energy required for the OD value to decrease to 70%.

TABLE 7

| ⊚ | Not less than 70,000 kJ/m$^2$ |
| --- | --- |
| ○ | Not less than 40,000 kJ/m$^2$ and less than 70,000 kJ/m$^2$ |
| Δ | Not less than 10,000 kJ/m$^2$ and less than 40,000 kJ/m$^2$ |
| x | Not more than 10,000 kJ/m$^2$ |

Trisazo compound (dye) (1) has a solubility in water (under an ammoniacal alkaline condition) of 14%. The result of its mutagenicity test (Ames test) proved negative (1.27 times). The results of the evaluation are shown in Table 15.

EXAMPLE 2

Synthesis Example of Trisazo Compound (2) (AN-251)

Trisazo compound (2) was obtained in substantially the same manner as described in Example 1, except that J acid (3-amino-8-naphthol-6-sulfonic acid) was used instead of γ acid used in Example 1, and the resulting compound was evaluated. The results of the evaluation are shown in Table

TABLE 8

Figure 2:
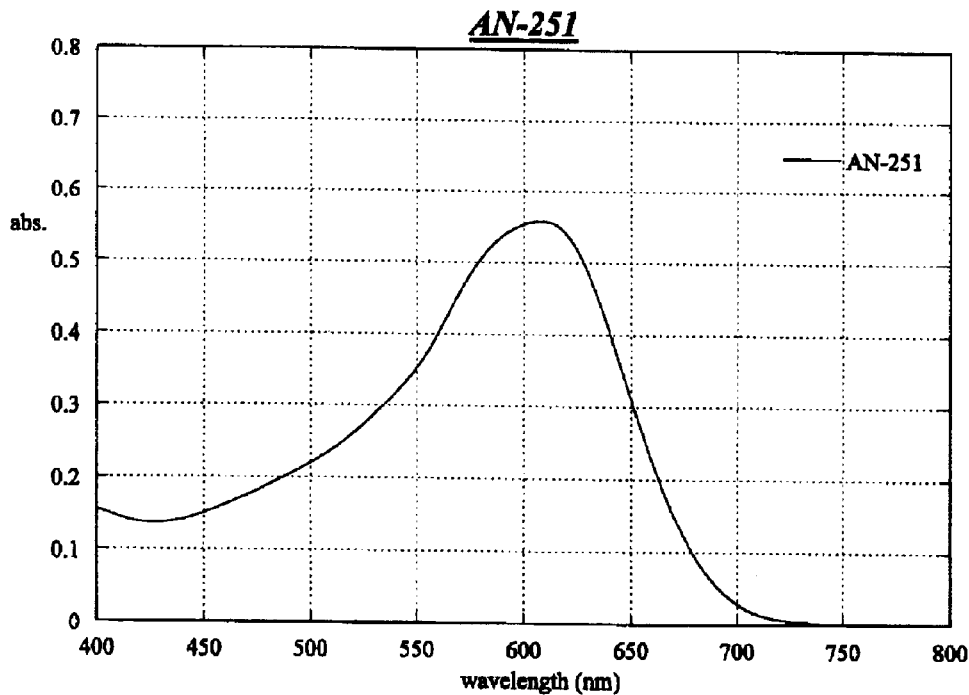
FIG. 2 shows a visible absorption spectrum of trisazo compound (2)
Figure 9:
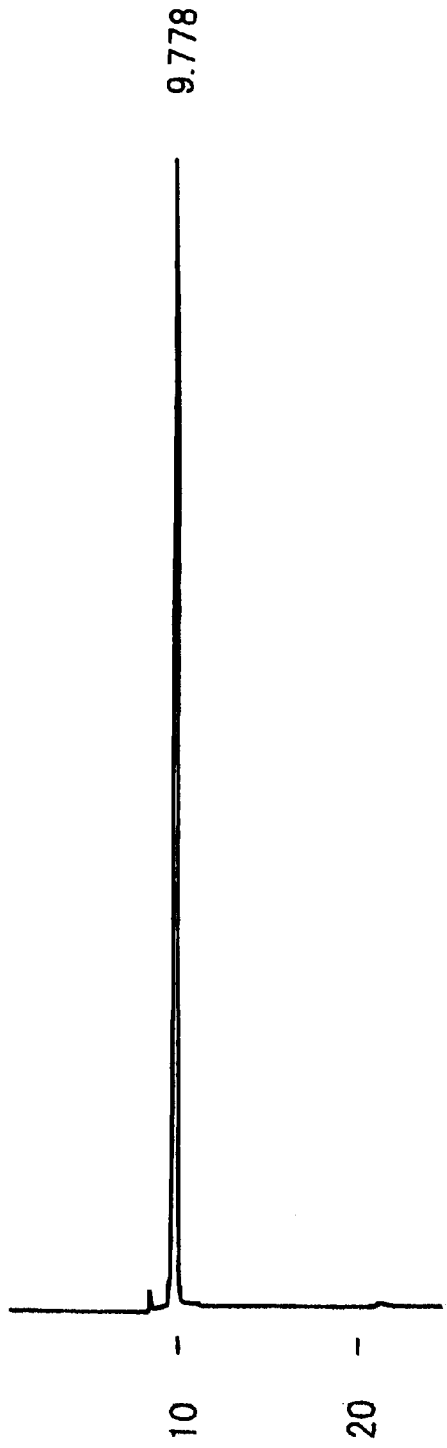
FIG. 9 shows an HPLC chart of trisazo compound (2)
Figure 16:
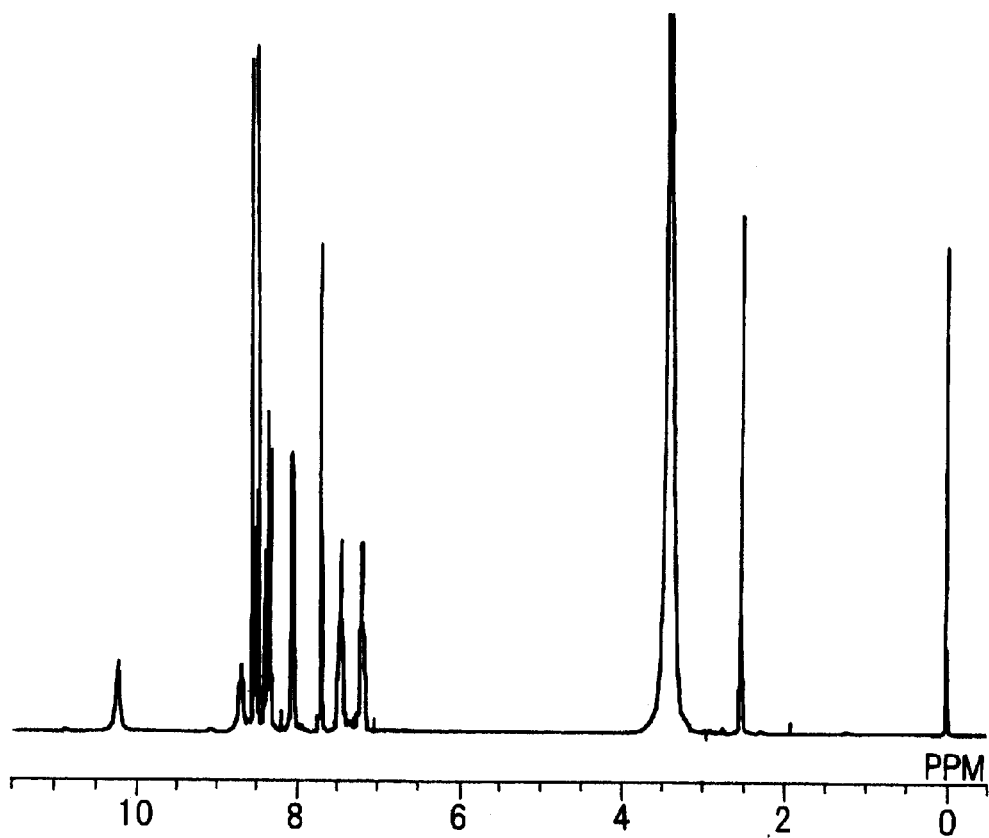
FIG. 16 shows an NMR spectrum of trisazo compound (2)
Figure 16:
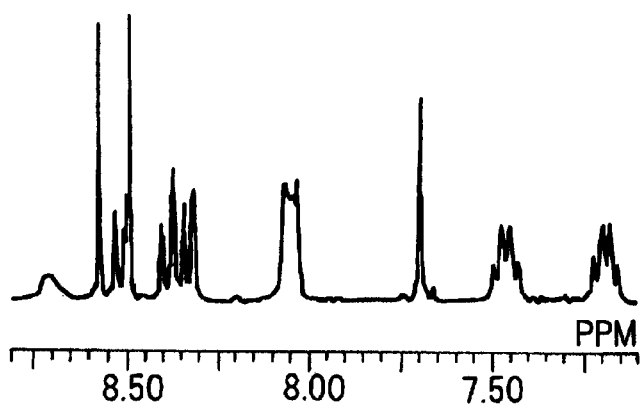

| Analysis data | |
| --- | --- |
| Visible absorption spectrum | FIG. 2 |
| HPLC (High-Performance Liquid Chromatography) | FIG. 9 |
| NMR spectrum | FIG. 16 |

EXAMPLE 3

Synthesis Example of Trisazo Compound (5) (AN-254)

Trisazo compound (5) was obtained in substantially the same manner as described in Example 1, except that p-phenetidine was used instead of the anthranilic acid used in Example 1, and was evaluated. The results of the evaluation are shown in Table 15.

TABLE 9

Figure 3:
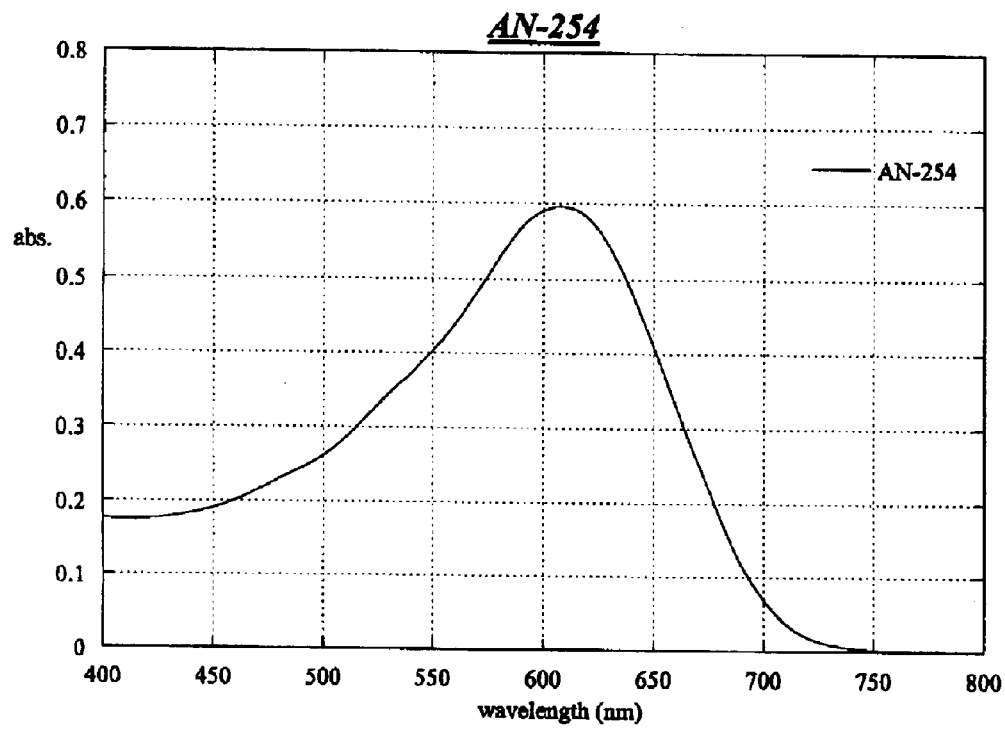
FIG. 3 shows a visible absorption spectrum of trisazo compound (5)
Figure 10:
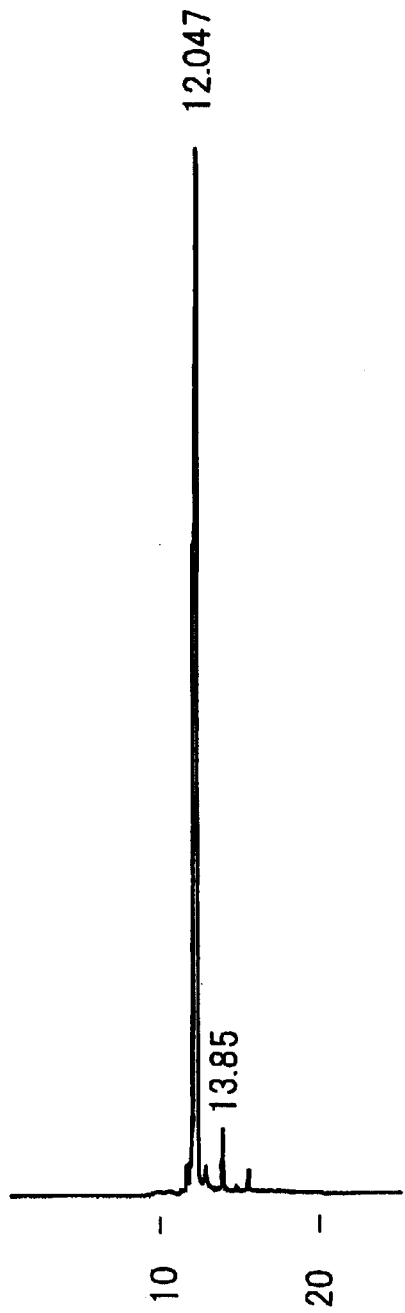
FIG. 10 shows an HPLC chart of trisazo compound (5)
Figure 17:
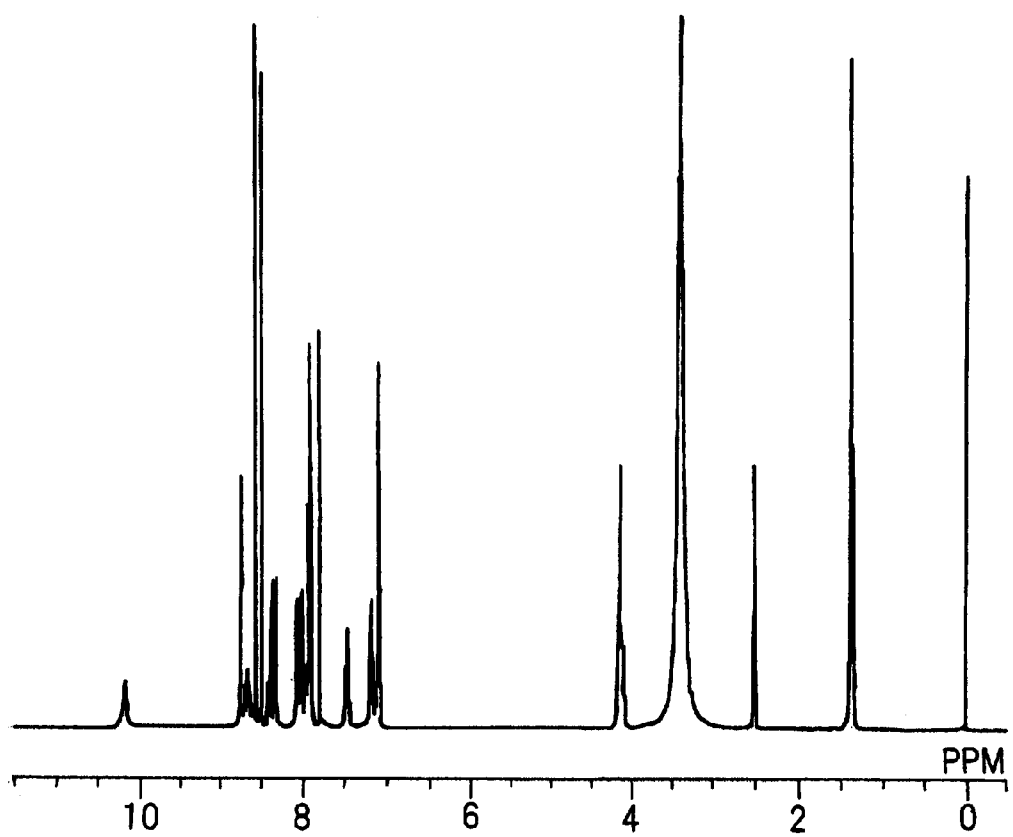
FIG. 17 shows an NMR spectrum of trisazo compound (5)
Figure 17:
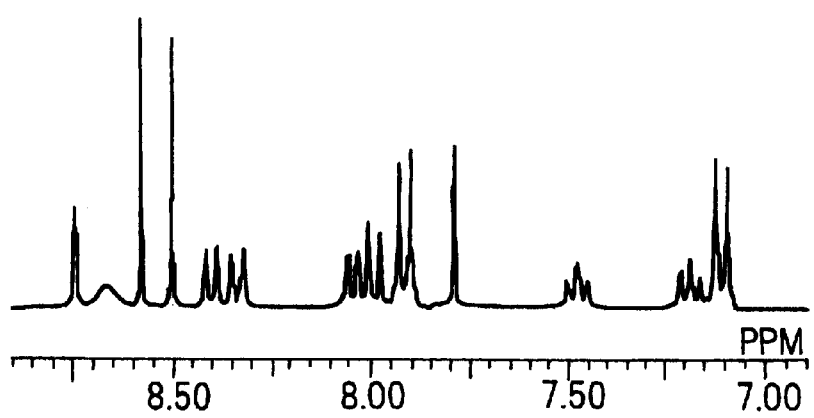

| Analysis data | |
|---|---|
| Visible absorption spectrum | FIG. 3 |
| HPLC (High-Performance Liquid Chromatography) | FIG. 10 |
| NMR spectrum | FIG. 17 |

EXAMPLE 4

Synthesis Example of Trisazo Compound (6) (AN-255)

Trisazo compound (6) was obtained in substantially the same manner as described in Example 1, except that 4-chloro-anthranilic acid and p-anisidine-2-sulfonic acid were used instead of the anthranilic acid and the methyl anthranilate used in Example 1 respectively, and the resulting compound was evaluated. The results of the evaluation are shown in Table 15.

TABLE 10

Figure 4:
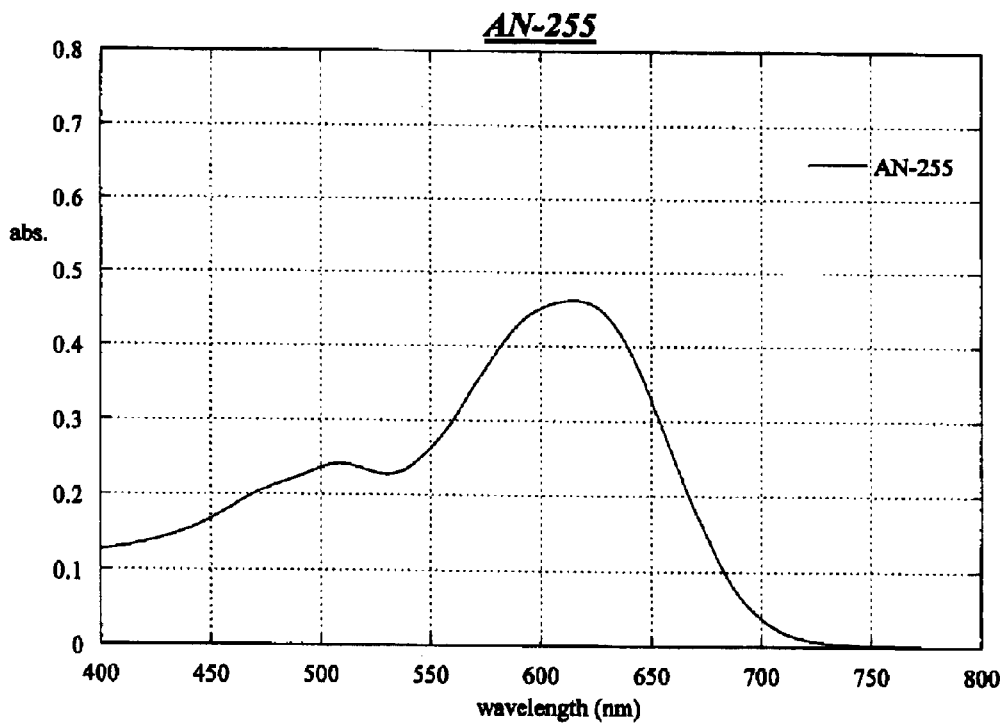
FIG. 4 shows a visible absorption spectrum of trisazo compound (6)
Figure 11:
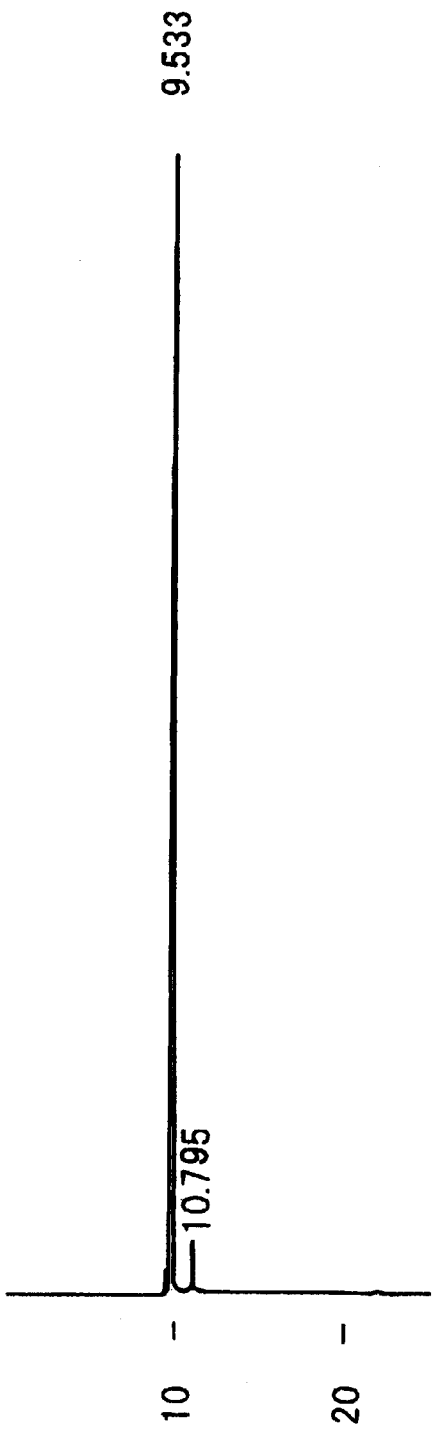
FIG. 11 shows an HPLC chart of trisazo compound (6)

| Analysis data | |
|---|---|
| Visible absorption spectrum | FIG. 4 |
| HPLC (High-Performance Liquid Chromatography) | FIG. 11 |

EXAMPLE 5

Synthesis Example of Trisazo Compound (8) (AN-257)

Trisazo compound (8) was obtained in substantially the same manner as described in Example 1, except that 2-aminoterephthalic acid was used instead of the methyl anthranilate used in Example 1, and the resulting compound was evaluated. The results of the evaluation are shown in Table 15.

TABLE 11

Figure 5:
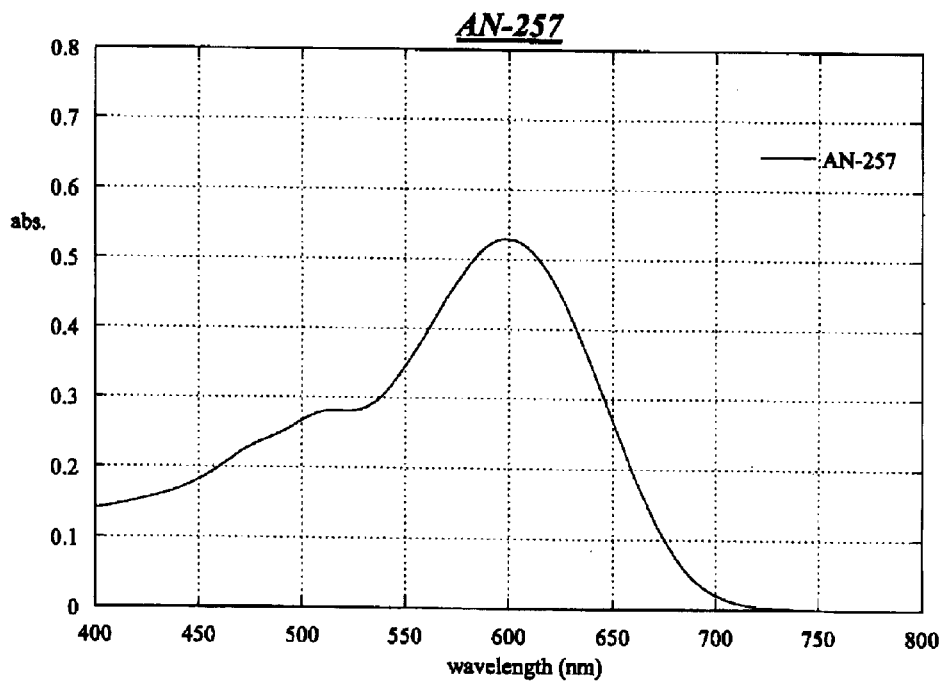
FIG. 5 shows a visible absorption spectrum of trisazo compound (8)
Figure 12:
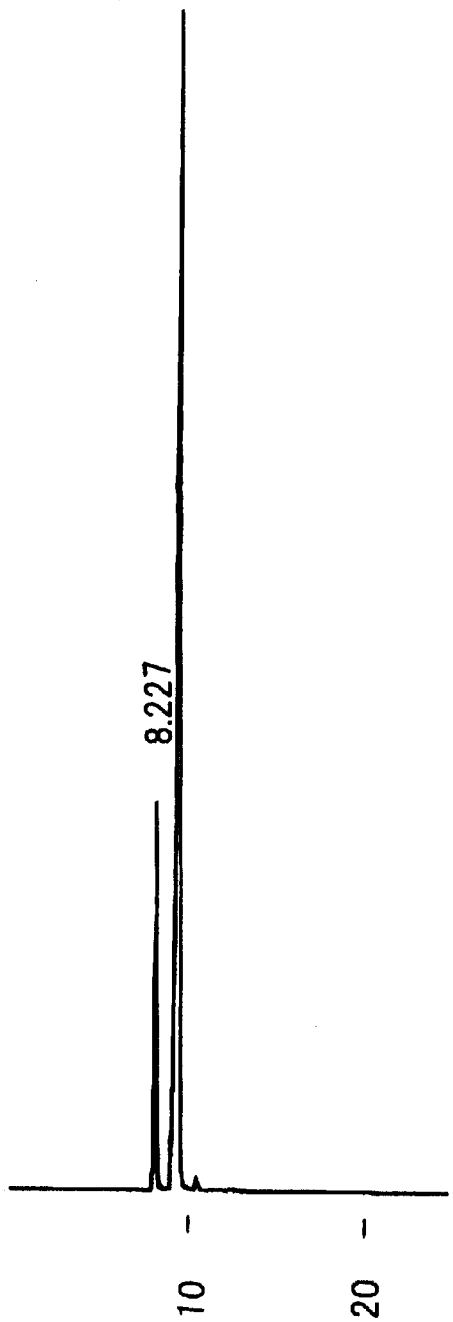
FIG. 12 shows an HPLC chart of trisazo compound (8)

| Analysis data | |
|---|---|
| Visible absorption spectrum | FIG. 5 |
| HPLC (High-Performance Liquid Chromatography) | FIG. 12 |

EXAMPLE 6

Synthesis Example of Trisazo Compound (10) (AN-259)

Trisazo compound (10) was obtained in substantially the same manner as described in Example 1, except that p-n-butylaniline was used instead of the anthranilic acid used in Example 1, and the resulting compound was evaluated. The results of the evaluation are shown in Table 15.

TABLE 12

Figure 6:
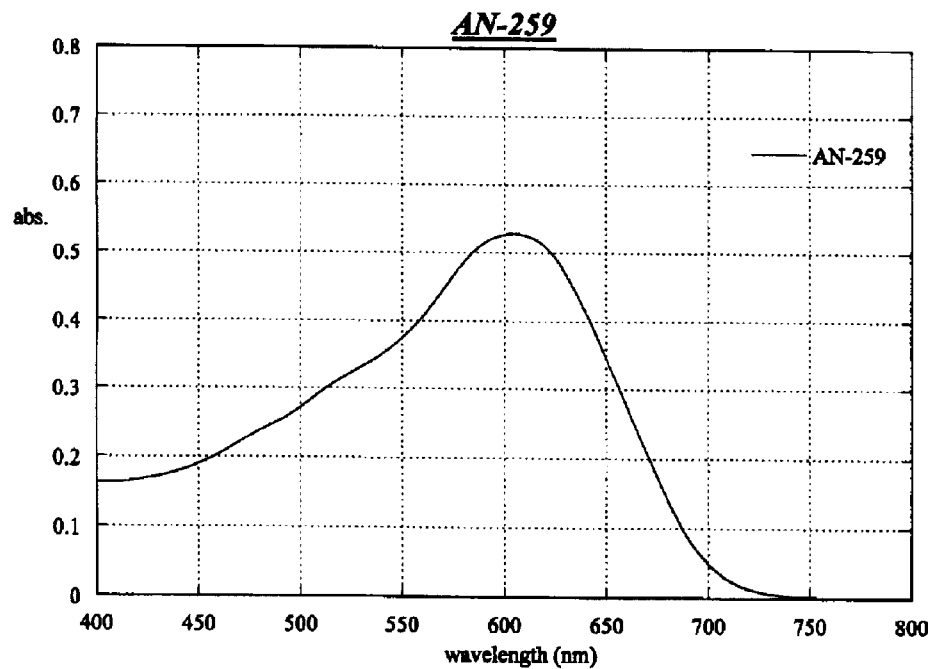
FIG. 6 shows a visible absorption spectrum of trisazo compound (10)
Figure 13:
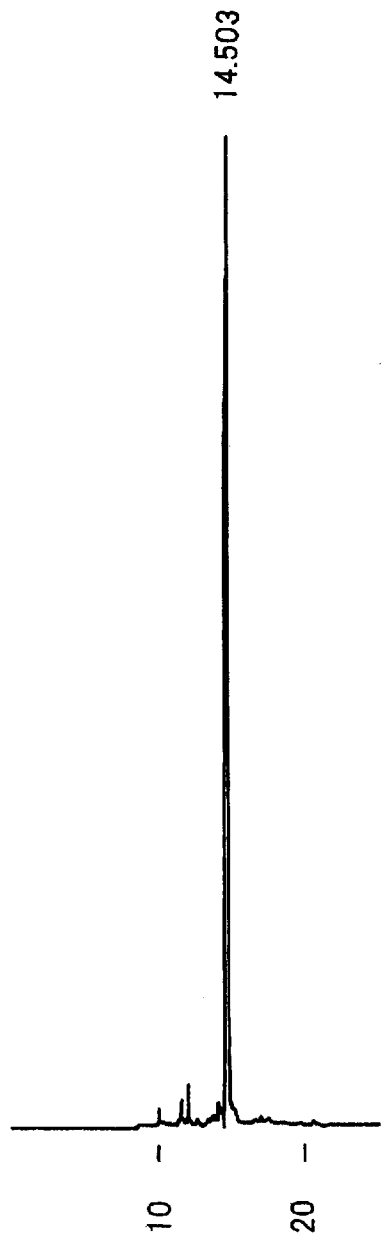
FIG. 13 shows an HPLC chart of trisazo compound (10)
Figure 18:
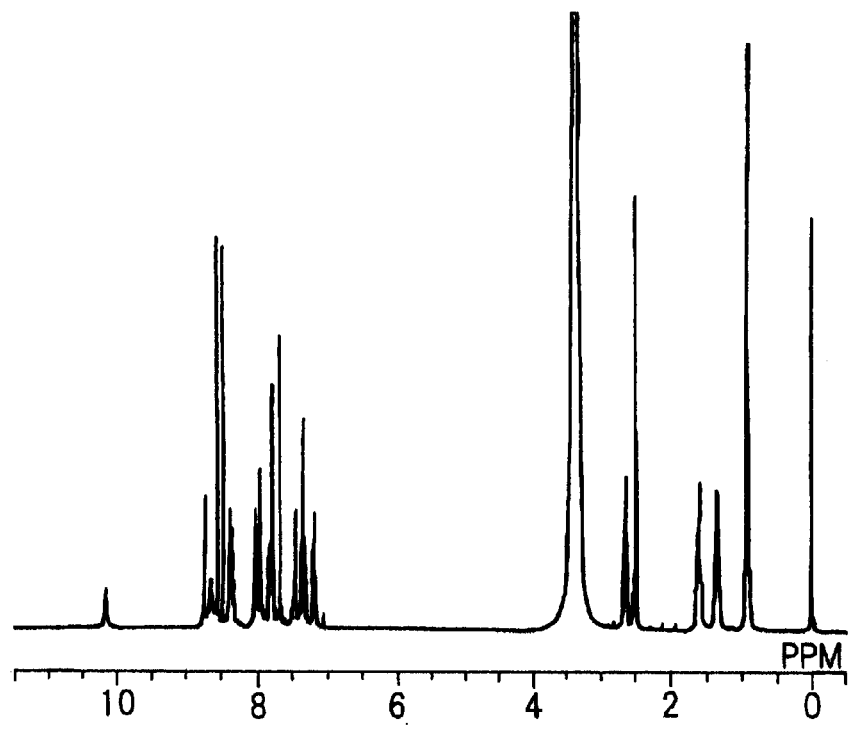
FIG. 18 shows an NMR spectrum of trisazo compound (10)
Figure 18:
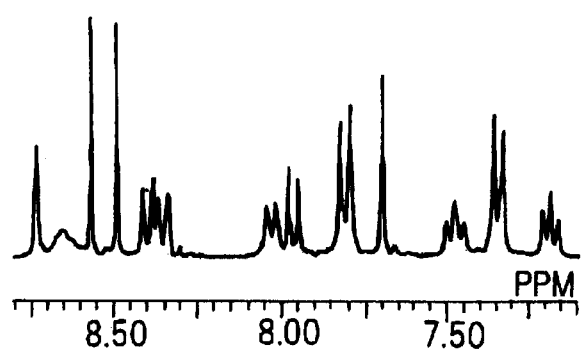
Figure 18:
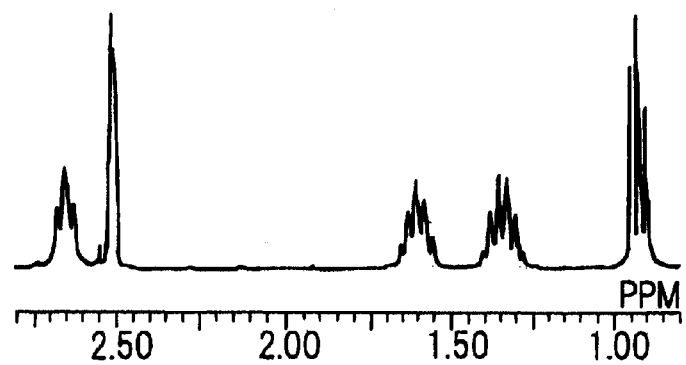

| Analysis data | |
|---|---|
| Visible absorption spectrum | FIG. 6 |
| HPLC (High-Performance Liquid Chromatography) | FIG. 13 |
| NMR spectrum | FIG. 18 |

EXAMPLE 7

Synthesis Example of Trisazo Compound (11) (AN-260)

Trisazo compound (11) was obtained in substantially the same manner as described in Example 1, except that 3-aminobenzoic acid was used instead of the anthranilic acid used in Example 1, and the resulting compound was evaluated. The results of the evaluation are shown in Table 15.

TABLE 13

Figure 7:
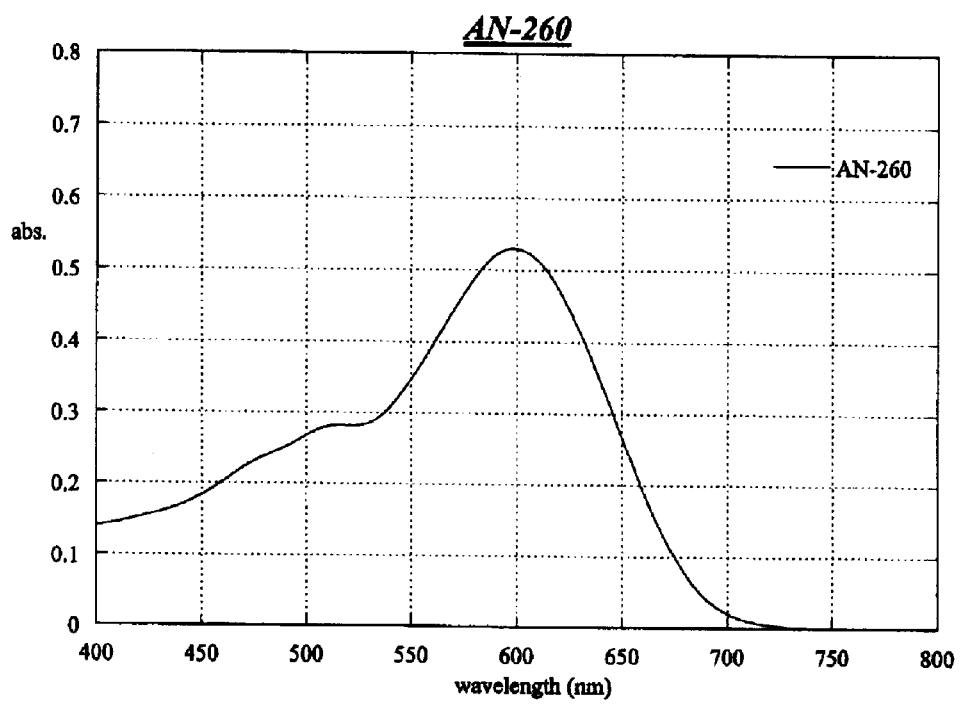
FIG. 7 shows a visible absorption spectrum of trisazo compound (11)
Figure 14:
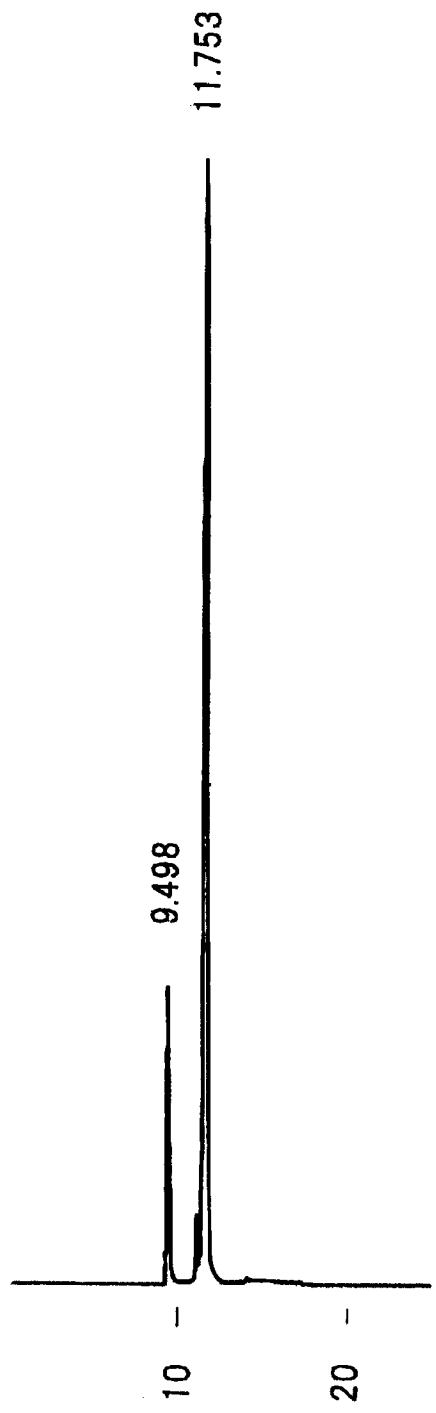
FIG. 14 shows an HPLC chart of trisazo compound (11)

| Analysis data | |
|---|---|
| Visible absorption spectrum | FIG. 7 |
| HPLC (High-Performance Liquid Chromatography) | FIG. 14 |

EXAMPLE 8

Synthesis Example of Trisazo Compound (14) (AN-261)

1) Synthesis of Monoazo Intermediate (1)

To 300 ml of water, 67.95 g (0.3 mol) of methyl anthranilate was charged. To this, 150 g of ice and 123.0 g (1.2 mol) of 35%-HCl aqueous solution was further added. This was cooled to 0° C., 86.25 g (0.45 mol) of 36%-NaNO, aqueous solution was added, and stirred at 3° C. for 30 minutes to obtain a diazo solution.

On the other hand, 121.2 g (0.3 mol) of K acid was charged to 1000 ml of water. This was dissolved by adding sodium carbonate. A coupling reaction was carried out under acidic condition by dropping the diazo solution prepared previously to the resulting solution. During the reaction, the reaction temperature was regulated so as not to exceed 6° C. After the addition of the diazo solution, stirring was continued for 1 hour and then additional stirring was carried out while adjusting the pH to 1.5 by dropping 10%-$Na_2CO_3$ aqueous solution. A precipitate was collected by filtration.

The resulting pressed cake was charged to 1000 ml of water, pH thereof was adjusted to not less than 12.5 by adding 20%-NaOH aqueous solution, and the mixture was stirred for 90 minutes at 60° C. This was cooled to 40° C., 260 g of salt was added, stirred for a while, pH thereof was adjusted to 3.3 by adding 35%-HCl aqueous solution, and a precipitate was collected by filtration to obtain the monoazo intermediate as shown below (purity: 88.4% determined by HPLC).

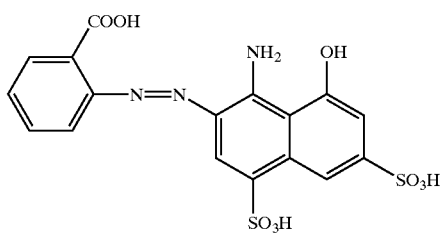

2) Synthesis of Monoazo Intermediate (2)

To 300 ml of water, 41.1 g (0.3 mol) of anthranilic acid was charged. This was dissolved by adding 20%-NaOH aqueous solution until the pH became 7.0. To the resulting solution, 63.3 g (0.33 mol) of a 36%-NaNO$_3$ aqueous solution was added and the temperature was lowered to 0° C. by adding ice. The pH was thereafter adjusted to 0.8 by adding 112.1 g (1.09 mol) of 35%-HCl aqueous solution. After stirring at 3° C. for 55 minutes, a diazo solution was obtained.

To 600 ml of water, on the other hand, 73.8 g (0.3 mol) of γ acid was charged and 20%-NaOH aqueous solution was added until the pH became 9. The temperature of the solution was lowered to 0° C. in a cooling bath. A coupling reaction was carried out by gradually adding the diazo solution prepared previously to the cooled solution. During the reaction, the pH of the reaction solution was regulated between 10.0 and 11.5 by adding 20%-NaOH aqueous solution and, at the same time, the reaction temperature was held so as not to exceed 7° C. After stirring the reaction solution at 10° C. overnight, the pH of the solution was adjusted to 4.0 by dropping 35%-HCl aqueous solution. A precipitate was collected by filtration to obtain the monoazo intermediate as shown below (purity: 98.5% determined by HPLC).

3) Synthesis of Trisazo Compound

To 1000 ml of water, a pressed cake of the monoazo intermediate (0.1 mol) obtained by step 2) was charged. This was dissolved by adding 20%-NaOH aqueous solution until pH became 7.4. To the resulting solution, 23 g (0.12 mol) of 36%-NaNO$_3$ aqueous solution was added and it was cooled to 18° C. The pH was thereafter adjusted to 0.7 by adding 61.4 g (0.6 mol) of 35%-HCl aqueous solution. After stirring at 20° C. for 90 minutes, a diazo solution was obtained.

On the other hand, a pressed cake of the monoazo intermediate (0.1 mol) was charged to 700 ml of water. This was dissolved by adding 20%-NaOH aqueous solution until pH became 10 and the temperature was lowered to 0° C. in an ice bath. A coupling reaction was carried out by gradually adding the diazo solution prepared previously to the cooled solution. During the reaction, the pH was regulated so as to be 8.0 to 11.0 by adding 20%-NaOH aqueous solution, and the reaction temperature was held so as not to exceed 7° C. After stirring the reaction solution at 12° C. overnight, 250 g of table salt was added thereto and was stirred for a short period of time. A precipitate was collected by filtration.

After the trisazo dye obtained above was dissolved in 1200 ml of water, 35%-HCl aqueous solution was added so that the pH became 1 to 2, and the dye was isolated by filtration. The press cake obtained was dissolved again in a proper amount of water by using aqueous ammonia. The solution was desalted with a reverse osmosis membrane (NTR-7430 manufactured by Nitto Denko Co., Ltd.). The dye desalted solution was then dried by freeze drying to obtain objective trisazo compound (14), AN-261 (purity: 94.4% determined by HPLC, λ$_{max}$: 624.4 nm (in water)). The resulted trisazo compound (14) was evaluated according to the same manner as described in Example 1. The results are shown in Table 15.

TABLE 14

Figure 19:
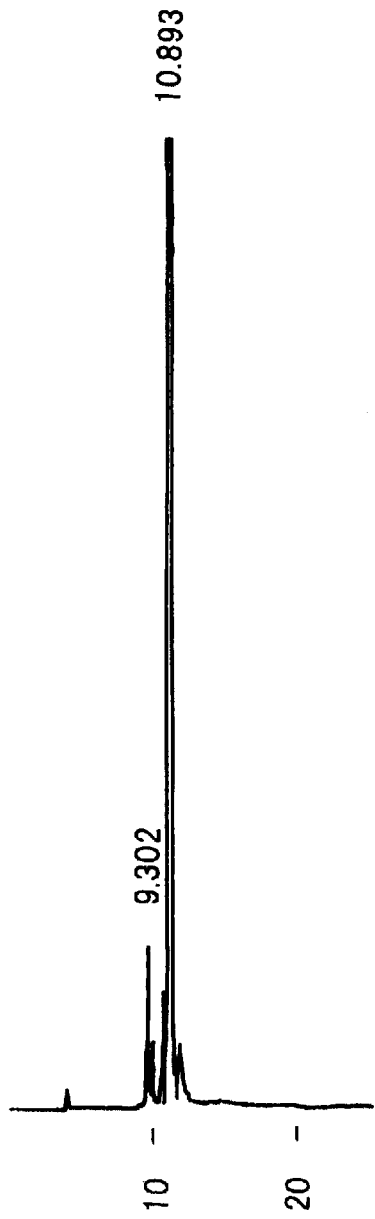
FIG. 19 shows an HPLC chart of trisazo compound (14)
Figure 20:
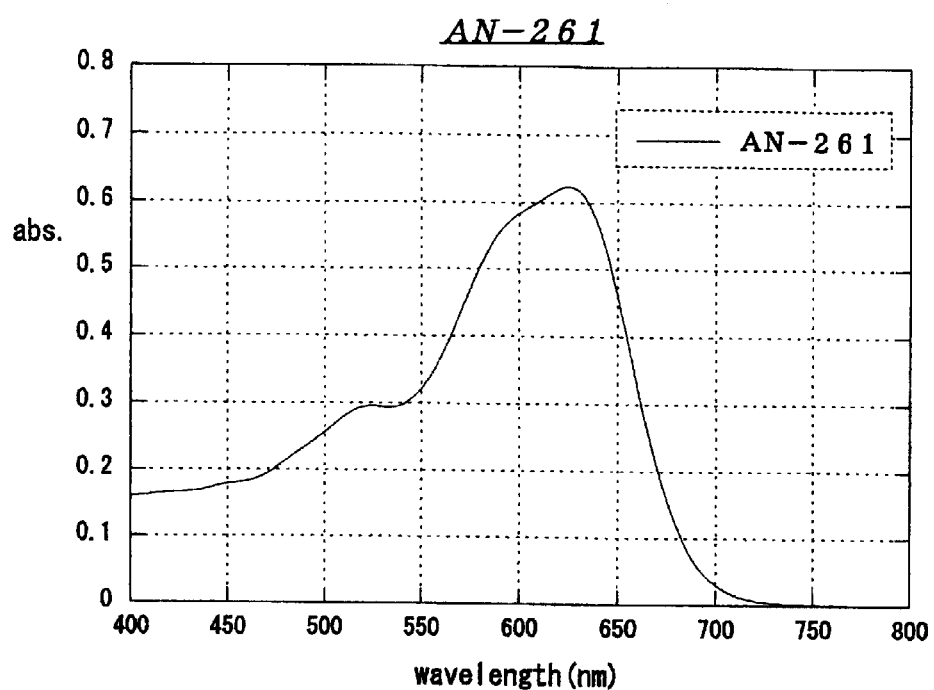
FIG. 20 shows a visible absorption spectrum of trisazo compound (14).

| Analysis data | |
|---|---|
| Visible absorption spectrum | FIG. 20 |
| HPLC (High-Performance Liquid Chromatography) | FIG. 19 |

COMPARATIVE EXAMPLE 1

C. I. Direct Black 154 was used as dye 1 for comparison. The results of the evaluation are shown in Table 15.

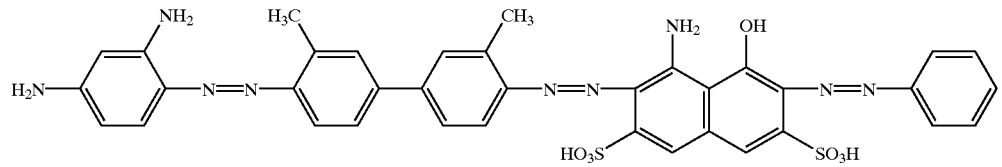

COMPARATIVE EXAMPLE 2

C. I. Direct Black 168 was used as dye 2 for comparison.
The results of the evaluation are shown in Table 15.

TABLE 15

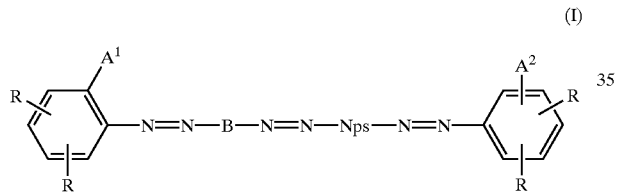

| Example of dye (salt) | | Purity by HPLC (%) | Evaluation of light resistance |
|---|---|---|---|
| Example 1 | Trisazo dye (1) (NH$_4$) | 96.3 | ⊚ |
| Example 2 | Trisazo dye (2) (NH$_4$) | 97.6 | ⊚ |
| Example 3 | Trisazo dye (5) (NH$_4$) | 96.4 | ⊚ |
| Example 4 | Trisazo dye (6) (NH$_4$) | 95.6 | ○ |
| Example 5 | Trisazo dye (8) (NH$_4$) | 86.1 | ⊚ |
| Example 6 | Trisazo dye (10) (NH$_4$) | 92.9 | ○ |
| Example 7 | Trisazo dye (11) (NH$_4$) | 84.4 | ○ |
| Example 8 | Trisazo dye (14) (NH$_4$) | 94.4 | ⊚ |
| Comparative Example 1 | C. I. Direct Black 154 (NH$_4$) | — | × |
| Comparative Example 2 | C. I. Direct Black 168 (NH$_4$) | — | Δ |

What is claimed is:

1. A trisazo compound represented by the formula:

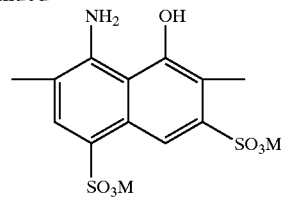

(I)

wherein $A^1$ is a group represented by the formula —COOM or —SO$_3$M wherein M is each independently a hydrogen atom, ammonium, alkali metal, hydroxyammonium, alkylammonium or alkanolammonium, $A^2$ is a hydrogen atom or a group represented by the formula —COOM or —SO$_3$M wherein M is the same as that described above, R is each independently a hydrogen atom, an alkyl group having from 1 to 6 carbon atoms, an alkoxy group having from 1 to 6 carbon atoms, a hydroxyl group, a sulfamoyl group, a carbamoyl group, a cyano group, an acetyl group, a sulfonic group, a carboxyl group or a halogen atom, B is a moiety represented by the formula:

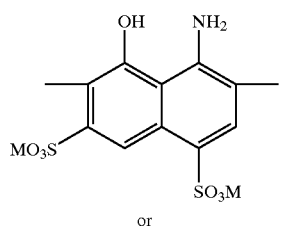

or

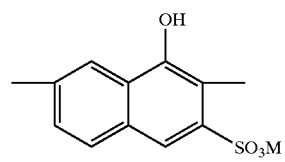

wherein, M is the same as that described above, Nps is a moiety represented by the formula:

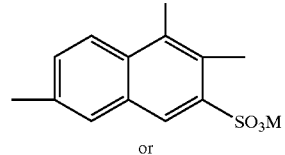

or

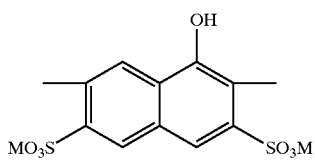

wherein M is the same as that described above.

2. The trisazo compound according to claim 1, wherein said $A^1$ is a group represented by the formula —COOM wherein M is the same as that described above.

3. A trisazo compound represented by the formula:

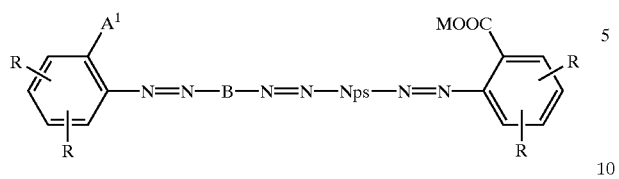

(II)

wherein M is each independently a hydrogen atom, ammonium, alkali metal, hydroxyammonium, alkylammonium or alkanolammonium, $A^1$ is a group represented by the formula —COOM or —$SO_3M$ wherein M is the same as that described above, R is each independently a hydrogen atom, an alkyl group having from 1 to 6 carbon atoms, an alkoxy group having from 1 to 6 carbon atoms, a hydroxyl group, a sulfamoyl group, a carbamoyl group, a cyano group, an acetyl group, a sulfonic group, a carboxyl group or a halogen atom, B is a moiety represented by the formula:

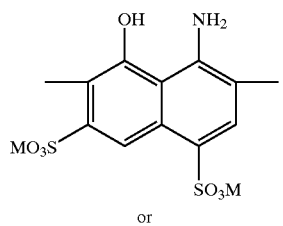

or

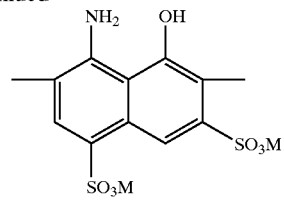

wherein, M is the same as that described above, Nps is a moiety represented by the formula:

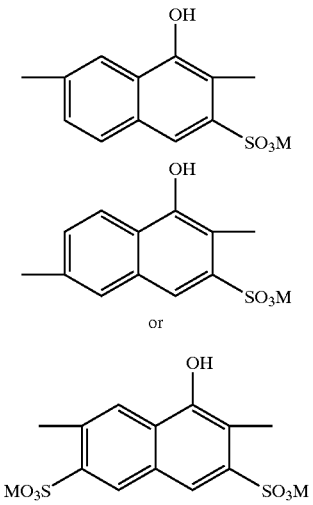

or wherein M is the same as that described above.

4. The trisazo compound according to claim 3, wherein said $A^1$ is a group represented by the formula —COOM wherein M is the same as that described above.

5. A trisazo compound having a structure represented by any one of the following formulae in the form of free acids:

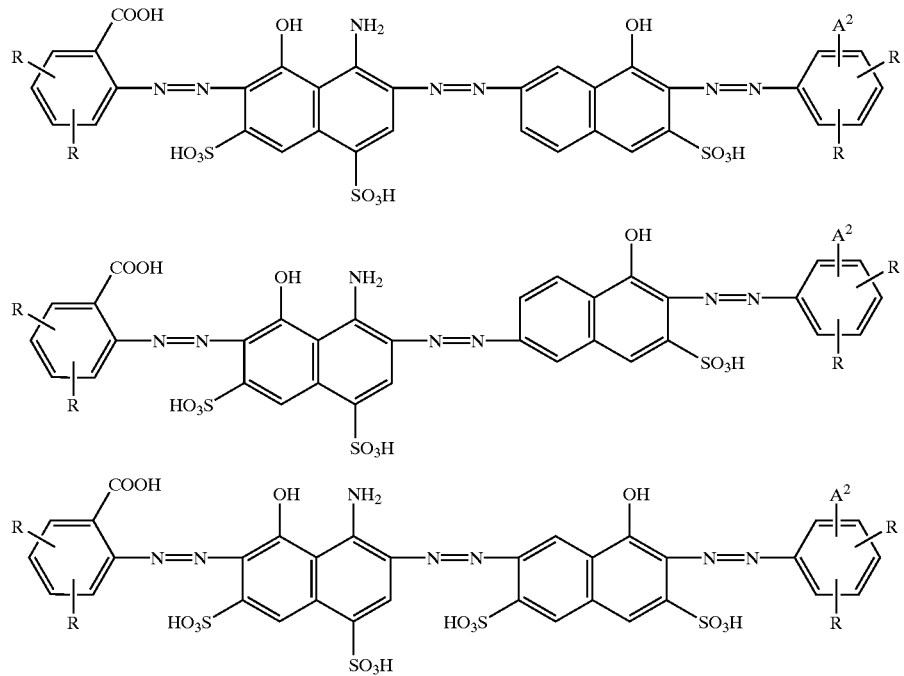

-continued

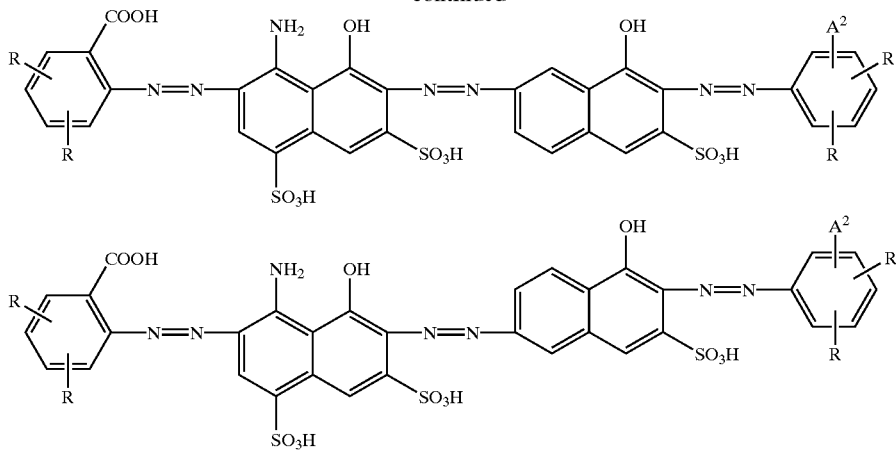

wherein $A^2$ is a hydrogen atom, a carboxyl group or a sulfonic group, R is each independently a hydrogen atom, an alkyl group having 1 to 6 carbon atoms, an alkoxy group having 1 to 6 carbon atoms, a hydroxyl group, a sulfamoyl group, a carbamoyl group, a cyano group, an acetyl group, a sulfonic group, a carboxyl group or a halogen atom.

6. A water-soluble dye which comprises the trisazo compound of any one of claims 1 to 5 in an amount of not less than 85% by weight.

7. A process for producing the trisazo compound of claim 1 comprising the steps of:
 a1) diazotizing an aniline derivative represented by the formula:

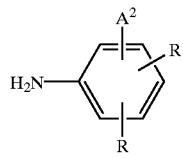

wherein, $A^2$ is a hydrogen atom or a group represented by the formula —COOM or —SO$_3$M wherein M is each independently a hydrogen atom, ammonium, alkali metal, hydroxyammonium, alkylammonium or alkanolammonium, R is each independently a hydrogen atom, an alkyl group having from 1 to 6 carbon atoms, an alkoxy group having from 1 to 6 carbon atoms, a hydroxyl group, a sulfamoyl group, a carbamoyl group, a cyano group, an acetyl group, a sulfonic group, a carboxyl group or a halogen atom;
 a2) subjecting the resulted diazotization product to alkaline coupling with a coupling component selected from the group consisting of γ acid, J acid and RR acid to obtain a monoazo intermediate represented by the formula:

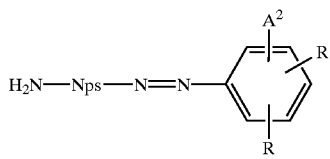

wherein $A^2$ and R are the same as those described above, and Nps is a residue of γ acid, J acid, or RR acid;

b1) diazotizing the monoazo intermediate;
b2) subjecting the resulted diazotization product to acidic coupling with K acid to obtain a disazo intermediate represented by the formula:

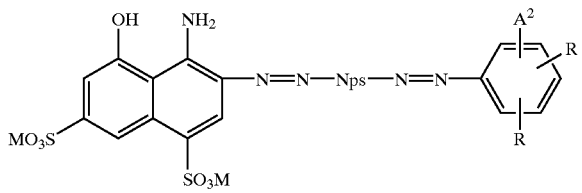

wherein M, $A^2$, R and Nps are the same as those described above;

c1) diazotizing an aniline derivative having a carboxyl group or a sulfonic group on its ortho position represented by the formula:

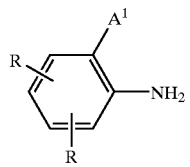

wherein $A^1$ is a group represented by the formula —COOM or —SO$_3$M wherein M is the same as that described above, and R is the same as that described above; and c2) subjecting the resulted diazotization product to alkaline coupling with the disazo intermediate resulted in step b2).

8. A process for producing the trisazo compound of claim 1 comprising the steps of:
 a1) diazotizing an aniline derivative represented by the formula:

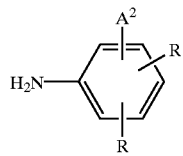

wherein, $A^2$ is a hydrogen atom or a group represented by the formula —COOM or —SO$_3$M wherein M is each independently a hydrogen atom, ammonium, alkali metal, hydroxyammonium, alkylammonium or alkanolammonium, R is each independently a hydrogen atom, an alkyl group having from 1 to 6 carbon atoms, an alkoxy group having from 1 to 6 carbon atoms, a hydroxyl group, a sulfamoyl group, a carbamoyl group, a cyano group, an acetyl group, a sulfonic group, a carboxyl group or a halogen atom;

a2) subjecting the resulted diazotization product to alkaline coupling with a coupling component selected from the group consisting of γ acid, J acid and RR acid to obtain a monoazo intermediate represented by the formula:

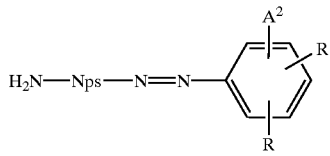

wherein $A^2$ and R are the same as those described above, and Nps is a residue of γ acid, J acid, or RR acid;

b1) diazotizing an aniline derivative having a carboxyl group or a sulfonic group on its ortho position represented by the formula:

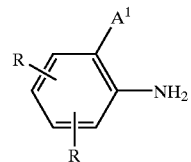

wherein $A^1$ is a group represented by the formula —COOM or —SO$_3$M wherein M is the same as that described above, and R is the same as that described above; and b2) subjecting the resulted diazotization product to acidic coupling with K acid to obtain a monoazo intermediate represented by the formula:

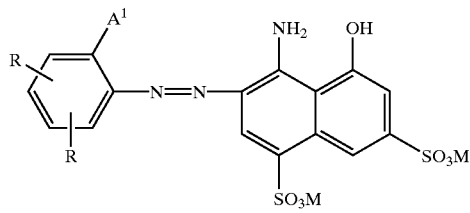

wherein $A^1$, R and M are the same as those described above;

c1) diazotizing the monoazo intermediate resulted in step a2); and c2) subjecting the resulted diazotization product to alkaline coupling with the monoazo intermediate resulted in step b2).

* * * * *